(12) United States Patent
Kim et al.

(10) Patent No.: US 9,712,028 B2
(45) Date of Patent: Jul. 18, 2017

(54) STATOR HAVING THREE-LINE CONNECTION STRUCTURE, BLDC MOTOR USING SAME, AND DRIVING METHOD THEREFOR

(71) Applicant: AMOTECH CO., LTD., Incheon (KR)

(72) Inventors: Byung Soo Kim, Gyeonggi-Do (KR); Se Ki Lee, Incheon (KR); Hyung Hwan Ko, Gyeonggi-Do (KR); Seong Cheol Park, Jeollabuk-Do (KR)

(73) Assignee: Amotech Co., Ltd., Incheon (KR)

( * ) Notice: Subject to any disclaimer, the term of this patent is extended or adjusted under 35 U.S.C. 154(b) by 440 days.

(21) Appl. No.: 14/387,787

(22) PCT Filed: Mar. 29, 2013

(86) PCT No.: PCT/KR2013/002641
§ 371 (c)(1),
(2) Date: Sep. 24, 2014

(87) PCT Pub. No.: WO2013/147550
PCT Pub. Date: Oct. 3, 2013

(65) Prior Publication Data
US 2015/0303780 A1    Oct. 22, 2015

(30) Foreign Application Priority Data

Mar. 30, 2012 (KR) .................. 10-2012-0032997
Mar. 28, 2013 (KR) .................. 10-2013-0033629

(51) Int. Cl.
*H02K 11/00* (2016.01)
*H02K 16/02* (2006.01)
(Continued)

(52) U.S. Cl.
CPC ............... *H02K 16/02* (2013.01); *H02K 1/14* (2013.01); *H02K 1/148* (2013.01); *H02K 1/2786* (2013.01);
(Continued)

(58) Field of Classification Search
CPC ...... H02K 16/02; H02K 16/025; H02K 1/148; H02K 11/215
(Continued)

(56) References Cited

U.S. PATENT DOCUMENTS

2004/0245878 A1* 12/2004 Kim .................. D06F 37/304
310/114
2006/0022544 A1* 2/2006 Kinashi ................ H02K 21/16
310/179
(Continued)

FOREIGN PATENT DOCUMENTS

JP      2009-284726 A   12/2009
KR   10-2003-0087775 A  11/2003
(Continued)

OTHER PUBLICATIONS

J.R. Hendershot Jr., Design of Brushless Permanent-Magnet Motors, Magna Physics Publishing and Clarendon Press Oxford 1994, pp. 10, 12 and 13.*

*Primary Examiner* — Thomas Truong
(74) *Attorney, Agent, or Firm* — Rosenberg, Klein & Lee

(57) ABSTRACT

Provided are a stator having a three-coil wiring structure, a BLDC motor using the same, and a driving method thereof, in which coils are wound by using a three-coil wiring method, to thus minimize a ratio between slots and poles, and to thereby reduce cogging noise, and a gap between cores is set small, to thus increase an effective area between a magnet and a core and to thereby reduce leakage magnetic flux. The BLDC motor includes: a stator having a plurality (Continued)

of split cores that are disposed between an inner rotor and an outer rotor, and on which coils of three phases are connected and wound in a three-phase drive method, in which the plurality of split cores include a number of core groups in which the coils of the respective phases are wound on three consecutive split cores in sequence of a forward direction, a reverse direction, and a forward direction, and the three consecutive split cores generate magnetic flux in opposite directions to each other.

9 Claims, 13 Drawing Sheets

(51) Int. Cl.
    *H02K 1/14*     (2006.01)
    *H02K 3/28*     (2006.01)
    *H02K 11/215*     (2016.01)
    *H02K 21/12*     (2006.01)
    *H02K 1/27*     (2006.01)
    *H02K 3/12*     (2006.01)
    *H02K 29/08*     (2006.01)

(52) U.S. Cl.
    CPC ................ *H02K 3/12* (2013.01); *H02K 3/28* (2013.01); *H02K 11/215* (2016.01); *H02K 21/12* (2013.01); *H02K 29/08* (2013.01)

(58) Field of Classification Search
    USPC ........................................ 310/114, 68 B, 266
    See application file for complete search history.

(56) References Cited

U.S. PATENT DOCUMENTS

2006/0125338 A1*   6/2006   Groening ................ H02K 3/28
                                                                  310/179
2007/0236099 A1*   10/2007   Kim ...................... D06F 37/304
                                                                  310/266
2009/0302793 A1*   12/2009   Kawamura ............ G01D 5/145
                                                                  318/400.38
2010/0156231 A1     6/2010   Lee et al.

FOREIGN PATENT DOCUMENTS

| KR | 10-2004-0002349 A | 1/2004 |
| KR | 10-2005-0000245 A | 1/2005 |
| KR | 10-0663641 B1 | 12/2006 |
| KR | 10-2010-0073449 A | 7/2010 |
| WO | 2007/114545 A1 | 10/2001 |

* cited by examiner

STATOR HAVING THREE-LINE CONNECTION STRUCTURE, BLDC MOTOR USING SAME, AND DRIVING METHOD THEREFOR

TECHNICAL FIELD

The present invention relates to a stator having a three-coil wiring structure, a brushless direct-current (BLDC) motor using the same, and a driving method thereof. More particularly, the present invention relates to a stator having a three-coil wiring structure, a BLDC motor using the same, and a driving method thereof, in which coils are wound by using a three-coil wiring method, to thus minimize a ratio between slots and poles, and to thereby reduce cogging noise, and a gap between cores is set small, to thus increase an effective area between a magnet and a core and to thereby reduce leakage magnetic flux.

BACKGROUND ART

A brushless direct-current (BLDC) motor may be classified into a core type or a radial gap type and a coreless type or an axial gap type, each having a generally cup-shaped cylindrical structure, according to whether or not a stator core exists.

A BLDC motor of a core type structure may be classified into an inner magnet type including a cylindrical stator where coils are wound on a plurality of protrusions formed on the inner circumferential portion thereof in order to form an electronic magnet structure, and a rotor formed of a cylindrical permanent magnet, and an outer magnet type including a stator where coils are wound up and down on a plurality of protrusions formed on the outer circumferential portion thereof, and a rotor formed of a cylindrical permanent magnet on the outer portion of which multiple poles are magnetized.

The magnetic circuit in the above-described core type BLDC motor has a symmetrical structure in the radial direction around the rotational shaft. Accordingly, the core type BLDC motor has less axial vibration noise, and is appropriate for low-speed rotation. Also, since a portion occupied by an air gap with respect to the direction of the magnetic path is extremely small, a high magnetic flux density may be obtained even if a low performance magnet is used or the amount of magnets is reduced. As a result, a big torque and a high efficiency may be obtained.

However, such a core, that is, a yoke structure may cause a big material loss of a yoke when manufacturing a stator. In addition, a special expensive dedicated winding machine should be used in order to wind coils on the yoke due to a complex structure of the yoke when mass-producing. In addition, a mold investment cost is high at a time of manufacturing a stator, to thus cause a high facility investment cost, in the case of the core type BLDC motor.

The core type alternating-current (AC) motor or the core type BLDC motor, especially, the core motor of the radial gap type, has high competitiveness, since coils can be wound on split type cores with high efficiency using a general purpose winding machine which is cheaper than a special-purpose expensive dedicated winding machine in the case that the stator core is configured into a complete split type. On the contrary, since a low efficient winding is made using the expansive dedicated winding machine, in the case of an integrated stator core structure, a manufacturing cost for the motors becomes high.

In order to employ the advantages of the axial gap type double rotor motor and the radial gap type core motor and improve the disadvantages thereof, a radial gap type core type double rotor structure BLDC motor has been proposed in Korean Patent Application Publication No. 10-432954 to the same applicant.

In the Korean Patent Application Publication No. 10-432954, rotors including respective permanent magnets are disposed in both the inner and outer sides of to thereby form flow of a magnetic path by the permanent magnets and the rotor yoke. It is thus possible to split the stator core completely into a plurality of stator core portions. Accordingly, productivity of the stator core can be heightened and a core material loss can be reduced through an individual coil winding process by using an inexpensive general purpose winding machine, and power of the motor can be greatly heightened by a combination of the stator core with a double-rotor.

In addition, in Korean Patent Application Publication No. 10-2005-245, there is provided an integral-type stator core that is manufactured by a process comprising: preparing a number of split-type core assemblies on which coils are wound; arranging the number of split-type core assemblies on which coils are wound on a printed circuit board PCB, so as to be fixed thereon; connecting the coils; and molding the number of split-type core assemblies arranged on a printed circuit board (PCB) in an annular shape by an insert molding with a thermosetting resin. Moreover, in the Korean Patent Application Publication No. 10-2005-245, there is proposed a stator structure in which split cores on which stator coils are wound are arranged alternately per phase of U, V, and W.

Meanwhile, a general BLDC motor uses a stator structure in which windings of the stator coils are arranged alternately in sequence per phase of U, V, and W, in the case of an integral type core, in which current flowing in the stator coils is selected alternately per phase according to a sequential switching drive of a switching transistor provided in an inverter circuit, to thereby generate a rotating magnetic field and to thus rotate a rotor.

For example, in the Korean Patent Application Publication Nos. 10-2005-245 and 10-2010-73449, there are provided motors of a double-rotor/single-stator structure each having a stator in which a number of split-type cores on which coils are wound are arranged alternately per phase of U, V, and W.

Hereinbelow, a method of designing a motor hereinafter, referred to as a "single-coil wiring structure" will be described in which one split core on which coils are wound per phase is disposed alternately per phase in a BLDC motor having a split core stator.

First, when designing a motor of a single-coil wiring structure typically, a setting between slots of a stator and rotor magnets magnetic poles is set as Equation 1.

The number of poles=the number of slots/3×Multiple of 2      Equation 1

However, in the case that the number of slots is greater than, for example, 27 in designing a motor, the number of magnetic poles is set to be larger than the number of slots. As a result, according to Equation 1, the number of slots and poles of the motor, is set at a ratio of, for example, 18-slot and 12-pole, 27-slot and 36-pole, and 36-slot and 48-pole.

Hereinbelow, referring to FIGS. 1A to 3, a BLDC motor that is designed according to a single-coil wiring method of a double-rotor/single-stator structure using a split-core type stator in which conventional split cores on which coils are wound are arranged alternately per phase, will be described.

FIG. 1A shows a structure of a BLDC motor employing a double rotor structure that is designed with an 18-slot and 12-pole type that is designed according to a conventional single-coil wiring method. FIG. 1B shows a structure of a BLDC motor employing a double rotor structure having a shape of cores and magnets deformed to reduce cogging noise. FIG. 2 shows a coil wiring diagram and a motor drive circuit of drive coils of three phases U, V, and W that are applied in FIG. 1A. FIG. 3 is a diagram showing a relationship between a placement order and mutual wirings at the time of assembling split cores.

Referring to FIGS. 1A to 3, in the case that a BLDC motor 10 of a double rotor structure designed according to a conventional single-coil wiring method is of an 18-slot and 12-pole type, inner rotors 3a and outer rotors 3b are arranged at intervals, in which N-pole and S-pole magnets are alternately placed at the inside and outside of stators 1. The 18 split cores u11-u16, v11-v16, and w11-w16 on which coils u1-u6, v1-v6, and w1-w6 are respectively wound are disposed in an annular form.

Six stator coils u1-u6, v1-v6, and w1-w6 are mutually connected per phase U, V, or W of the stators 1, in which one side of each phase is connected to an output of U, V, or W of an inverter circuit 5 forming a motor drive circuit as shown in FIG. 2, and the other side of each phase is connected to each other to thus form a neutral point NP.

All of the stator coils u1-u6, v1-v6, and w1-w6 are wound on the split cores u11-u16, v11-v16, and w11-w16, respectively, in the forward direction, and are arranged alternately per phase U, V, or W and are assembled as shown in FIG. 3. In other words, the 18 split cores u11-u16, v11-v16, and w11-w16 are assembled in sequence of u1, v1, w1, u2, . . . , w5, u6, v6, and w6 and integrated on a stator support by an insert molding method using resins and formed in an annular form.

Hereinbelow, an operation of the BLDC motor 10 of a double rotor structure designed according to a conventional single-coil wiring method will be described with reference to Table 1.

TABLE 1

| Electrical angle | 0° | 60° | 120° | 180° | 240° | 300° | 360°, 0° |
|---|---|---|---|---|---|---|---|
| Mechanical angle | 0° | 10° | 20° | 30° | 40° | 50° | 60°, 0° |
| H1 | N | N | S | S | S | N | N |
| H2 | S | N | N | N | S | S | S |
| H3 | S | S | S | N | N | N | S |
| Input | U | V | V | W | W | U | U |
| Output | W | W | U | U | V | V | W |
| Upper FET | FET1 | FET3 | FET3 | FET5 | FET5 | FET1 | FET1 |
| Lower FET | FET2 | FET2 | FET4 | FET4 | FET6 | FET6 | FET2 |

As shown in Table 1, according to the conventional art, three Hall elements H1-H3 are sequentially placed between the slots, and are disposed at an angle that is determined by (360/the number of slots), that is, at intervals of 20°, to thereby detect a magnetic pole (N-pole or S-pole) of rotors 3a and 3b for each step and to then transmit the detected magnetic pole to a motor drive circuit.

The motor shown in FIG. 1A shows the status at 0° in which the directions of currents flowing in the stator coils u1-u6, v1-v6, and w1-w6 are changed per 10° in a six-step mode, and the currents whose flowing directions have been changed are applied to the corresponding split cores u11-u16, v11-v16, and w11-w16 to thereby form an electromagnet and to thus generate a magnetic field.

A motor drive circuit includes a controller (not shown) and an inverter circuit 5. The inverter circuit 5 is configured to include three pairs of switching transistors FETs that are connected in a totem pole structure, respectively, in which an output of each phase U, V, or W occurs from a junction between each of the upper switching transistors FETs that are FET1, FET3, and FET5 and each of the lower switching transistors FETs that are FET4, FETE, and FET2 corresponding to the upper switching transistors FETs that are FET1, FET3, and FET5, respectively, to thus be applied to the stator coils u1-u6, v1-v6, and w1-w6 of the motor 10. The controller (not shown) of the motor drive circuit controls the inverter circuit 5 to turn on a pair of the switching transistors FETs according to Table 1 to set a current flow path, if the position signals of the rotors 3a and 3b are detected by the Hall elements H1-H3 at the respective angles.

For example, as shown in FIG. 1A, the Hall elements H1-H3 detect the polarity of the outer rotor 3b as "N, S, S", the controller (not shown) judges that the rotational position of the rotor is regarded as 0°, and applies drive signals to turn on the upper switching transistor FET1 and the lower switching transistor FET2. Accordingly, a current flows to ground via FET1, U-phase coils (u1-u6), W-phase coils (w6-w1), and FET2.

Accordingly, magnetic flux is generated in an inner direction of the split core u11, and magnetic flux is generated in an outer direction of the split core w11. Thus, a magnetic circuit is set as indicated by arrows of FIG. 1B, and the double rotor 3 is rotated clockwise in which the internal rotor 3a and the external rotor 3b are set as the N-pole and S-pole magnets to face each other.

In the BLDC motor 10 of FIG. 1A, for example, the split core u11 that generates the magnetic flux in the inner direction thereof is preferably configured so that an outside of the split core 11 is opposed to only the N-pole magnet 13 of the outer rotor 3b, but is also opposed to the S-pole magnet 14 adjacent to a part of the split core u11, and an inside of the split core 11 is opposed to only the S-pole magnet 13a of the inner rotor 3a, but is also opposed to the N-pole magnet 14a adjacent to a part of the split core u11, to thereby drop efficiency.

In this case, the split cores u11-u16, v11-v16, and w11-w16 of the stator 1 in the BLDC motor 10 are activated when drive signals are applied to coils of split cores while skipping a split core corresponding to one phase of three phases U, V, and W per step.

For example, as shown in FIG. 1A, when the rotational position of the rotor 3 is 0°, the split cores u11-u16 and w11-w16 of the stator 1 are activated when drive signals are applied to coils u1-u6 and w1-w6 wound on two consecutive U-phase and W-phase split cores u11-u16 and w11-w16 while skipping the V-phase split core v11-v16. As a result, the two consecutive split cores that have been activated generate the magnetic flux in opposite directions.

As described above, the BLDC motor 10 is configured so that the outside of the split core 11 is opposed to the S-pole magnet 14 adjacent to the N-pole magnet 13, in addition to the N-pole magnet 13, and the inside of the split core 11 is opposed to the N-pole magnet 14a adjacent to the S-pole magnet 14, in addition to the S-pole magnet 14, and a non-activated the split core v11 is disposed between the S-pole magnet 14 and the N-pole magnet 14a that face each other, to thus fail to form a magnetic circuit that is effective to rotate the rotor 3 in one direction.

In addition, in the case of the rotor 3 in the motor 10 shown in FIG. 1A, an offset is not be made at a portion where adjacent N-pole and S pole magnets overlap each other as the number of slots becomes smaller, to thereby cause the noise to occur.

Moreover, the BLDC motor 10 designed according to a conventional single-coil wiring method may be configured to set the slots and poles of the motor to have a structure of 18-slot and 12-pole, 27-slot and 36-pole, or 36-slot and 48-pole. In this case, since the ratio of the number of slots and poles becomes 30~40% or so, an effective area of a magnetic force (or magnetic flux) between each of magnets 13-16 and each split core varies depending on the angle of rotation during rotation of the rotor 3. As a result, cogging may severely occur and magnetic flux leakage may occur.

Accordingly, as shown in FIG. 1B, to minimize noise caused by cogging, the BLDC motor 10 according to the conventional single-coil wiring method is required to have a wide opening width between a slot and another slot, to round an outer circumferential surface of each split core, and to edge-process (or round) corners of each magnet 13-16. As a result, a rise in production costs, and performance degradation may be caused.

After all, an opening width between a slot and another slot in the BLDC motor 10 according to the conventional single-coil wiring method should be wide to obtain good efficiency and to reduce noise, in which the opening width should be above a certain level. In addition, since the BLDC motor 10 according to the conventional single-coil wiring method is configured so that coils wound on the respective split cores may be connected together, a lot of wiring portions are also pointed out as disadvantages.

Moreover, as described above, since the BLDC motor 10 according to the conventional single-coil wiring method is configured so that the Hall elements H1-H3 may be sequentially placed at angles determined depending on (360°/the number of slots) or {(360°/the number of poles)×2 poles÷3}, a Hall element printed circuit board (PCB) on which three Hall elements are mounted should be disadvantageously made in size to cover a range of a 40° angle.

Meanwhile, since the Korean Patent Application Publication No. 10-2005-245 has a problem that an expensive large printed circuit board (PCB) should be used for wiring and assembly of coils with respect to a large number of split core assemblies, Korean Patent Registration No. 10-663641 was proposed in order to exclude a large printed circuit board (PCB) for assembly and to solve the wiring problems.

To this end, the Korean Patent Registration No. 10-663641 proposed a stator in which coils are continuously forwardly wound on nine split cores that are allocated for each phase of U, V, and W, the nine split cores are classified into three core groups, and the three core groups that are connected with three coils per phase are alternately arranged in turn.

In this case, each core group that has been connected with three coils is made for the purpose of removing the PCB for assembly and simultaneously solving the wiring problems between the respective split cores, in which coils are forwardly wound on the three split cores that have been connected with three coils.

As a result, since the motor of the three-coil wiring structure of the 27-slot and 24-pole structure is configured to have the three consecutive split cores on which coils are forwardly wound, a split core that is located in the middle of the three-coil wired three split cores offsets the magnetic flux of the other split cores that are disposed in the front and rear ends of the middle split core, to accordingly fail to contribute effectively in rotating the rotor and to improve the efficiency of the motor.

Meanwhile, a motor with a stator in which coils of a two-coil wiring method are sequentially arranged per phase has been proposed and the two-coil wiring method employs a forward and reverse wiring sequence of coils wound on teeth of an integral type stator core.

The motor employing the two-coil wiring method causes cogging noise smaller than the motor employing the single-coil wiring method, but causes a problem of increasing the number of coil wiring portions in comparison with the motor employing the three-coil wiring method, and a problem of enlarging a printed circuit board (PCB) for assembling Hall elements therewith since the Hall elements are disposed per two slots (30°). In addition, since a nozzle of a winding machine should enter between slots in an integral type stator core, an opening width between cores should be maintained over a certain range to thus enable windings. Thus, the motor employing the two-coil wiring method was applied for the purpose of reducing cogging not for the purpose of increasing efficiency of the motor.

As described above, the motor employing the conventional single-coil or two-coil wiring method has problems such as the high cogging noise, the low efficiency, a lot of coil wiring portions, and the large-sized PCB for assembling the Hall element therewith, in common

DISCLOSURE

Technical Problem

To solve the above problems or defects, it is an object of the present invention to provide a stator having a three-coil wiring structure, a brushless direct-current (BLDC) motor using the same, and a driving method thereof, in which coils are wound by using a three-coil wiring method, to thus minimize a ratio between slots and poles, and to thereby reduce cogging noise, and a gap between cores is set small, to thus increase an effective area between a magnet and a core and to thereby reduce leakage magnetic flux.

In addition, it is another object of the present invention to provide a stator having a three-coil wiring structure in which a coil is wound in a reverse direction around a core positioned in the middle of three consecutive cores so that all of three cores generate magnetic flux to rotate opposing magnets of a rotor in an identical direction, when a motor drive signal of an identical phase is applied to three consecutive coils.

Furthermore, it is still another object of the present invention to provide a brushless direct-current (BLDC) motor using a stator having a three-coil wiring structure, in which coils are wound by using a three-coil wiring method, and thus three cores operate like a single set, to thereby set an effective magnetic flux path and to thus increase an effective area of magnets and to thus obtain an increase in efficiency, even if a portion overlapping between S-pole and N-pole magnets adjacent to each other in a double rotor that faces both end portions of a core.

In addition, it is yet another object of the present invention to provide a stator having a three-coil wiring structure that can make a compact Hall element assembly in size by minimizing an interval at which Hall elements are disposed to detect a rotor position signal.

In addition, it is still yet another object of the present invention to provide a stator having a three-coil wiring structure having a simple winding method and a simple coil wiring method by performing sequential windings in which a three-coil wiring method is used for split cores.

In addition, it is a further object of the present invention to provide a brushless direct-current (BLDC) motor using a stator having a three-coil wiring structure, in which as an opening width of a core becomes narrow, an effective area of the core in opposition to a magnet is enlarged to thus increase efficiency of the motor, and to thereby have no need to round edges of a stator core and the magnet.

In addition, it is a further object of the present invention to provide a driving method of a three-coil wiring structure, in which a winding direction and a drive signal of a three-phase drive circuit are changed so that adjacent split cores generate magnetic flux in opposite directions to each other, and thus a attraction force and a repulsive force are generated simultaneously in an identical direction between inner and outer rotors that are set to have a polarity opposite to each other, respectively.

In addition, it is a further object of the present invention to provide a driving method of a three-coil wiring structure, in which a ratio between slots and poles of a stator is minimized to achieve low cogging noise and increase the efficiency of a motor.

In addition, it is a further object of the present invention to provide a BLDC motor of a single rotor and double rotor structure by using a stator having a three-coil wiring structure.

Technical Solution

To accomplish the above and other objects of the present invention, according to an aspect of the present invention, there is provided a brushless direct-current (BLDC) motor comprising:

a double rotor having an inner rotor and an outer rotor in which a number of N-pole and S-pole magnets consisting of opposite polarity are alternately arranged at opposite positions of the inner rotor and the outer rotor facing each other; and a stator having a plurality of split cores that are disposed between the inner rotor and the outer rotor, and on which coils of three phases are connected and wound in a three-phase drive method, wherein the plurality of split cores comprise a number of core groups in which the coils of the respective phases are wound on three consecutive split cores in sequence of a forward direction, a reverse direction, and a forward direction, and the three consecutive split cores generate magnetic flux in opposite directions to each other.

According to another aspect of the present invention, there is provided a brushless direct-current (BLDC) motor comprising:

a rotor in which a number of N-pole and S-pole magnets are alternately arranged; and a stator that is disposed with a gap spaced from the rotor and on which coils of three phases are connected in a three-phase drive method and wound on a plurality of teeth of a core, wherein the plurality of teeth comprise a number of core groups in which the coils of the respective phases are wound on three consecutive teeth in sequence of a forward direction, a reverse direction, and a forward direction, and the three consecutive teeth generate magnetic flux in opposite directions to each other.

According to still another aspect of the present invention, there is provided a brushless direct-current (BLDC) motor comprising:

a rotor in which a number of N-pole and S-pole magnets are alternately arranged; and a stator that is disposed with a gap spaced from the rotor and on which coils of three phases are connected in a three-phase drive method and wound on a plurality of teeth of a core, wherein the plurality of teeth comprise a number of core groups in which the coils of the respective phases are wound on three consecutive teeth in sequence of a forward direction, a reverse direction, and a forward direction, and wherein when drive signals are applied to the coils, six consecutive teeth of two phases from among the three phases are set to be activated, three consecutive teeth of one phase that is disposed between the six consecutive teeth are set to be inactivated, and the activated six consecutive teeth generate magnetic flux in opposite directions to each other.

According to yet another aspect of the present invention, there is provided a brushless direct-current (BLDC) motor comprising:

a rotor in which a number of N-pole and S-pole magnets are alternately arranged; and a stator that is disposed with a gap spaced from the rotor and on which coils of three phases are connected in a three-phase drive method and wound on a plurality of teeth of a core, wherein the number of magnets of the rotor is determined by using {(the number of slots/9)×8} and the number of slots is set to a multiple of nine, and wherein the stator is configured so that coils are wound on the plurality of teeth that is determined as (the multiple of nine/3) per phase of U, V, or W.

According to still yet another aspect of the present invention, there is provided a stator having a three-coil wiring structure, the stator comprising:

a core in which a plurality of teeth are extended radially from an annular back yoke; and three-phase coils that are wound on each of the plurality of teeth, wherein the three-phase coils are wound in different winding directions on intermediate teeth that are located in the middle of three consecutive teeth per phase, and front teeth and rear teeth that are located in the front and rear ends of the intermediate teeth, so as to generate magnetic flux between the adjacent teeth in opposite directions to each other, and are alternately arranged per phase.

According to a further aspect of the present invention, there is provided a motor drive method of driving a three-phase brushless direct-current (BLDC) motor, the method comprising the steps of:

preparing a three-phase driven BLDC motor that is configured so that a double rotor is coupled in the three-phase driven BLDC motor, wherein the double rotor is configured so that a number of N-pole and S-pole magnets are alternately arranged with a gap spaced from a stator, wherein the stator is configured so that a plurality of core groups are alternately arranged per phase of U, V, or W, wherein the plurality of core groups are configured so that three-phase coils are wound on three consecutive split cores per phase of U, V, or W in sequence of a forward direction, a reverse direction, and a forward direction;

determining position of the double rotor on the basis of a rotor position signal detected by a rotor position detection element; and applying drive signals to coils of two phases from among the three-phase coils based on the rotor position, and when the drive signals are applied to two adjacent core groups, six consecutive split cores included in the adjacent two core groups generate magnetic flux in opposite directions to each other.

According to a further aspect of the present invention, there is provided a motor drive method of driving a three-phase brushless direct-current (BLDC) motor, the method comprising the steps of:

preparing a three-phase driven BLDC motor that is configured so that a rotor is coupled in the three-phase driven BLDC motor, wherein the rotor is configured so that a number of N-pole and S-pole magnets are alternately arranged with a gap spaced from a stator, wherein the stator is configured so that a plurality of core groups are alternately arranged per phase of U, V, or W, wherein the plurality of core groups are configured so that three-phase coils are wound on three consecutive teeth per phase of U, V, or W in sequence of a forward direction, a reverse direction, and a forward direction;

determining position of the double rotor on the basis of a rotor position signal detected by a rotor position detection element; and applying drive signals to coils of two phases from among the three-phase coils based on the rotor position, and when the drive signals are applied to two adjacent core groups, six consecutive teeth included in the adjacent two core groups generate magnetic flux in opposite directions to each other.

Advantageous Effects

As described above, according to the present invention, coils are wound by using a three-coil wiring method, to thus minimize a ratio between slots and poles, and to thereby reduce cogging noise, and a gap between cores is set small, to thus increase an effective area between a magnet and a core and to thereby reduce leakage magnetic flux.

In addition, a coil is wound in a reverse direction around a core positioned in the middle of three consecutive cores so that all of three cores generate magnetic flux to rotate opposing magnets of a rotor in an identical direction, when a motor drive signal of an identical phase is applied to three consecutive coils.

Furthermore, coils are wound by using a three-coil wiring method, and thus three cores operate like a single set, to thereby set an effective magnetic flux path and to thus increase an effective area of magnets and to thus obtain an increase in efficiency, even if a portion overlapping between S-pole and N-pole magnets adjacent to each other in a double rotor that faces both end portions of a core.

In addition, a compact Hall element assembly can be made in size by minimizing an interval at which Hall elements are disposed to detect a rotor position signal.

In addition, a simple winding method and a simple coil wiring method can be applied by performing sequential windings in which a three-coil wiring method is used for split cores.

In addition, as an opening width of a core becomes narrow, an effective area of the core in opposition to a magnet is enlarged to thus increase efficiency of the motor, and to thereby have no need to round edges of a stator core and the magnet.

In addition, a winding direction and a drive signal of a three-phase drive circuit are changed so that adjacent split cores generate magnetic flux in opposite directions to each other, and thus a attraction force and a repulsive force are generated simultaneously in an identical direction between inner and outer rotors that are set to have a polarity opposite to each other, respectively.

BEST MODE

Figure 1A:
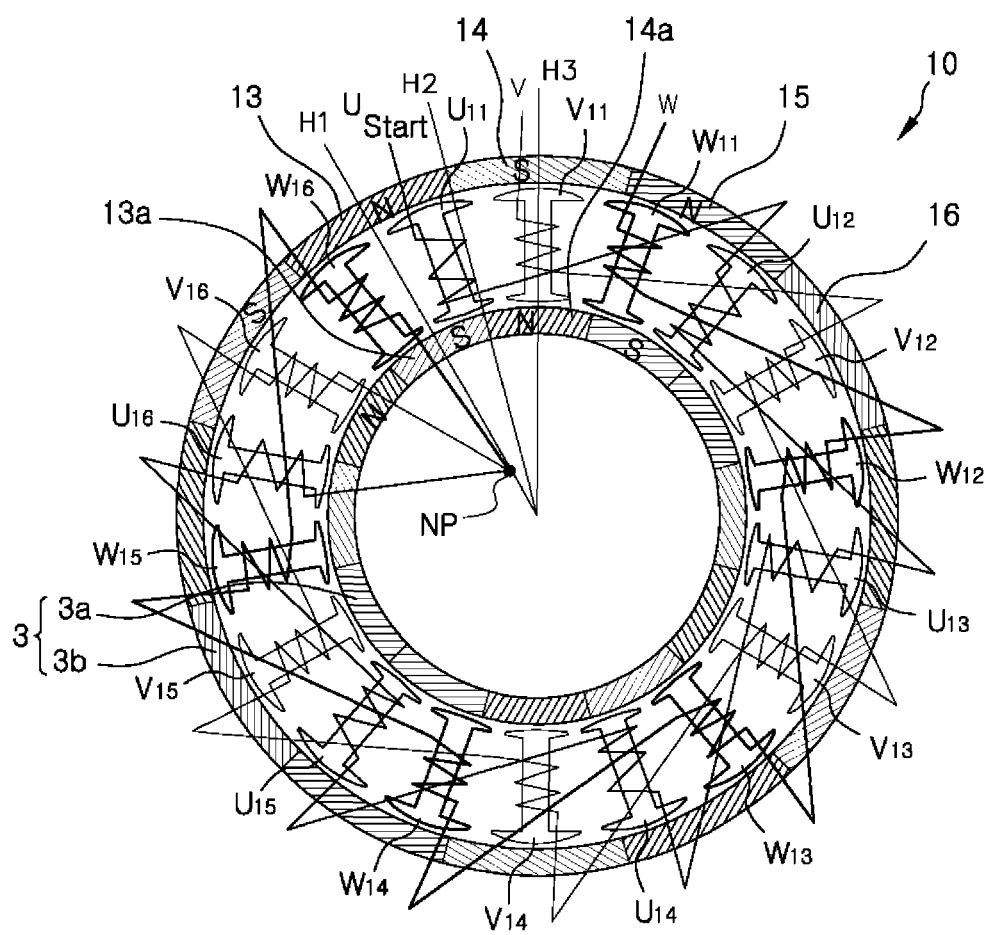
FIG. 1A is a diametric cross-sectional view illustrating a brushless direct-current (BLDC) motor of a double rotor structure that is designed as an 18-slot and 12-pole pattern in accordance with a conventional single-coil wiring method.
Figure 1B:
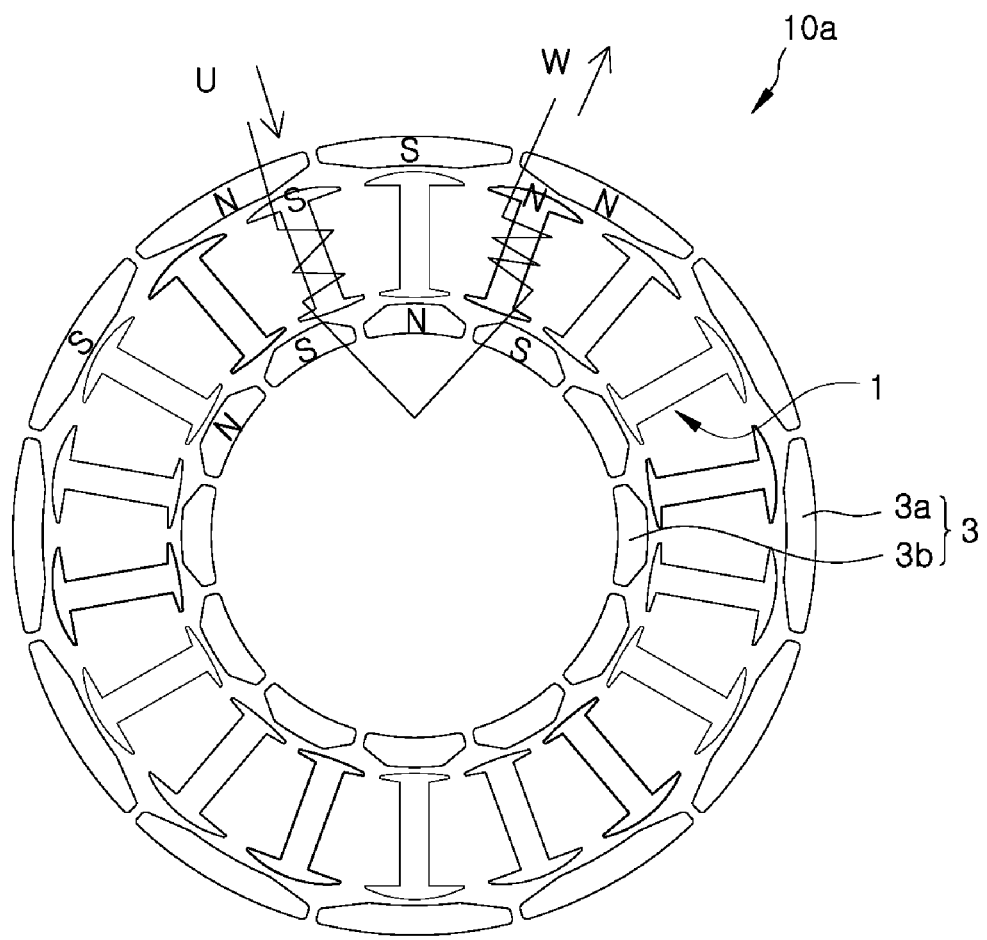
FIG. 1B is a diametric cross-sectional view illustrating a brushless direct-current (BLDC) motor of a double rotor structure that is made of cores and magnets of shapes modified in order to reduce the cogging noise.
Figure 2:
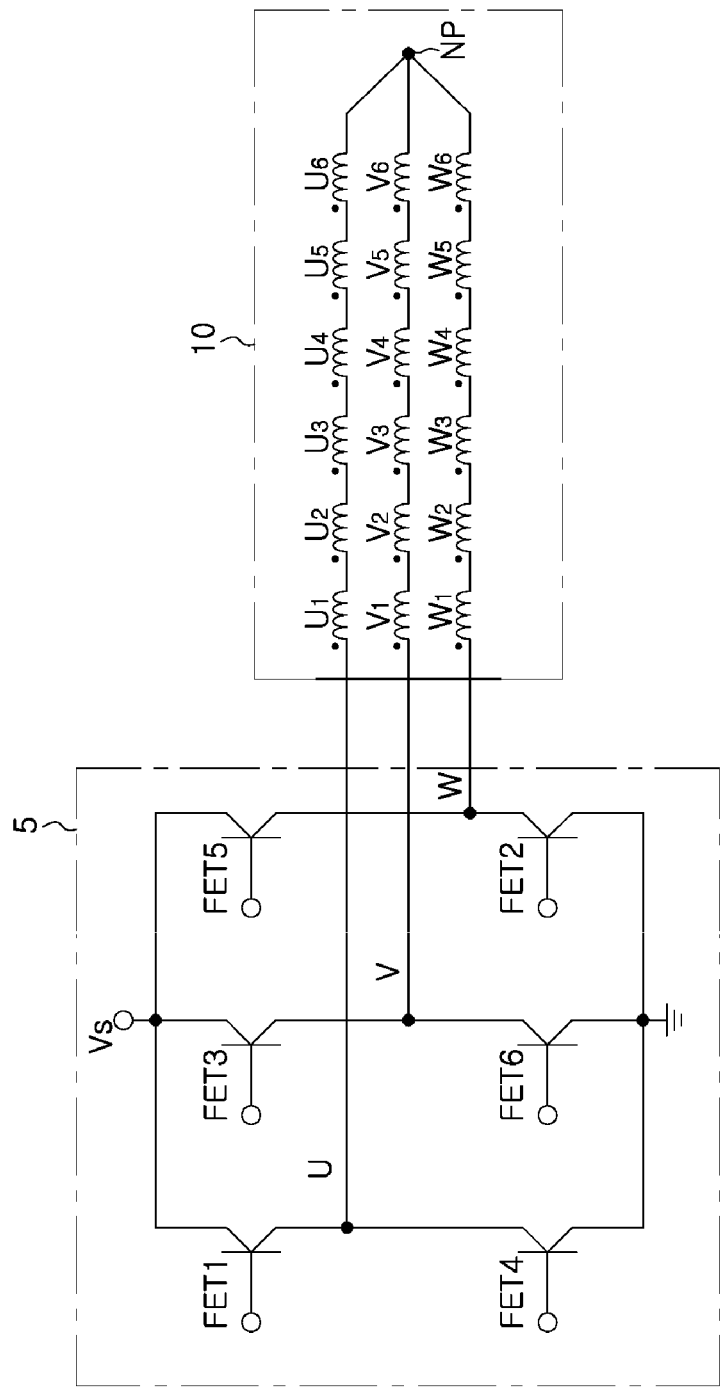
FIG. 2 shows a coil wiring diagram and a motor drive circuit of drive coils of three phases U, V, and W that are applied in FIG. 1A.
Figure 3:
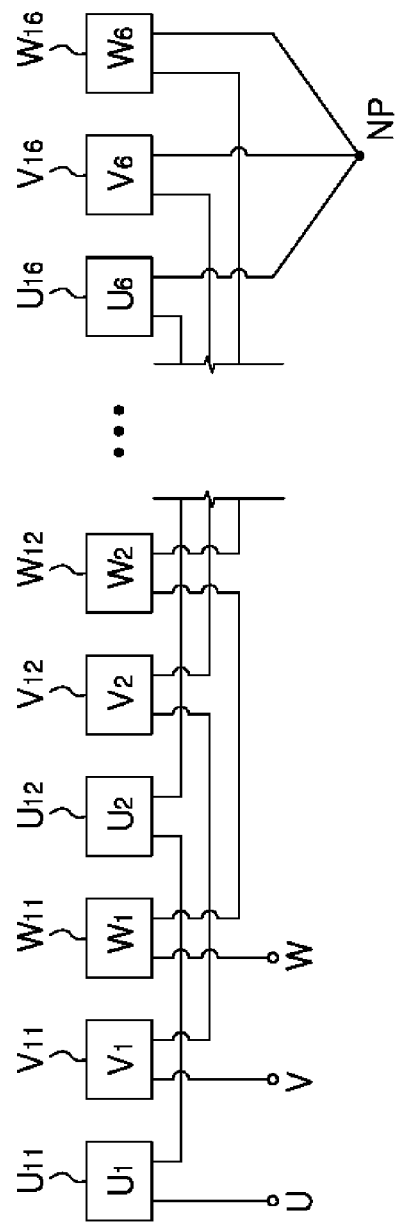
FIG. 3 is a diagram showing a relationship between a placement order and mutual wirings at the time of assembling split cores in the motors shown in FIGS. 1A and 1B.

As the invention allows for various changes and numerous embodiments, exemplary embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of the related art are omitted when it is deemed that they may unnecessarily obscure the essence of the invention.

While such terms as "first," "second," etc., may be used to describe various components, such components must not be limited to the above terms. The above terms are used only to distinguish one component from another. For example, without departing from the scope of claims of the present invention, the first component may be referred to as the second component, and similarly the second component may be also named as the first component. The term "and/or" may include a combination of a plurality of related items listed, or any item of a plurality of related items listed.

When it is said that a component is "connected," or "coupled" to another element, it is to be appreciated that the former may be connected or coupled directly to the latter, but a third element may be interposed between the former and the latter. Meanwhile, when it is said that a component is "directly connected," or "directly coupled" to another element, it is to be appreciated that no other elements exist between the former and the latter.

The terms used in the present specification are merely used to describe exemplary embodiments, and are not intended to limit the present invention. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, preferred embodiments of the present invention will be described in detail with reference to the accompanying drawings. Hereinafter, same numbers refer to same elements throughout, and the duplicate explanation of the like elements will be omitted.

A rotor used in the following examples the invention means a rotating rotor, a single rotor thereof means a single rotating rotor, and a stator means a fixed stator.

Preferred embodiments of the present invention will be described in detail with reference to the accompanying drawings.

Figure 4A:
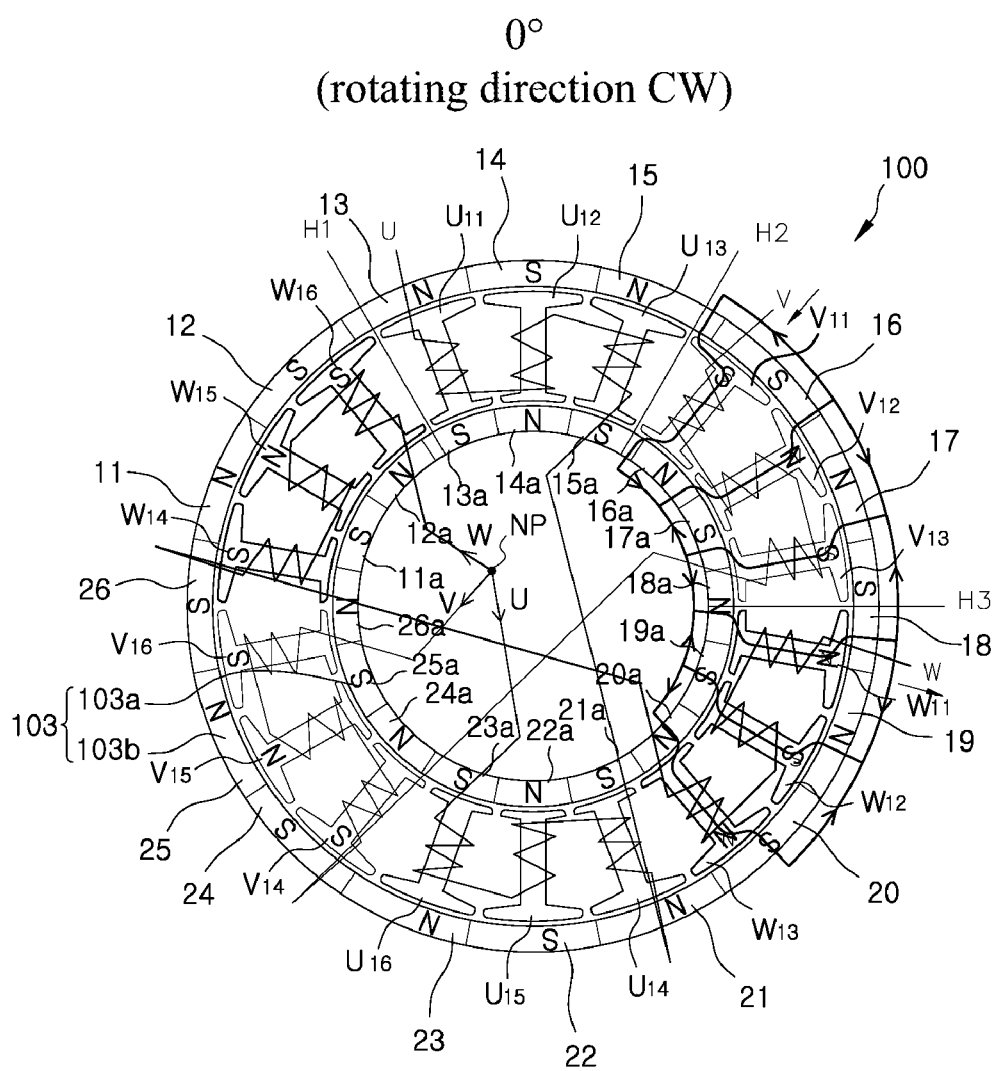
FIGS. 4A and 4B are diametric cross-sectional views respectively illustrating a brushless direct-current (BLDC) motor of a double rotor structure that is designed as an 18-slot and 16-pole pattern by using a three-coil wiring method according to a first embodiment of the present invention when the rotor is located at an angle of "0°" and "7.5°", respectively.
Figure 4B:
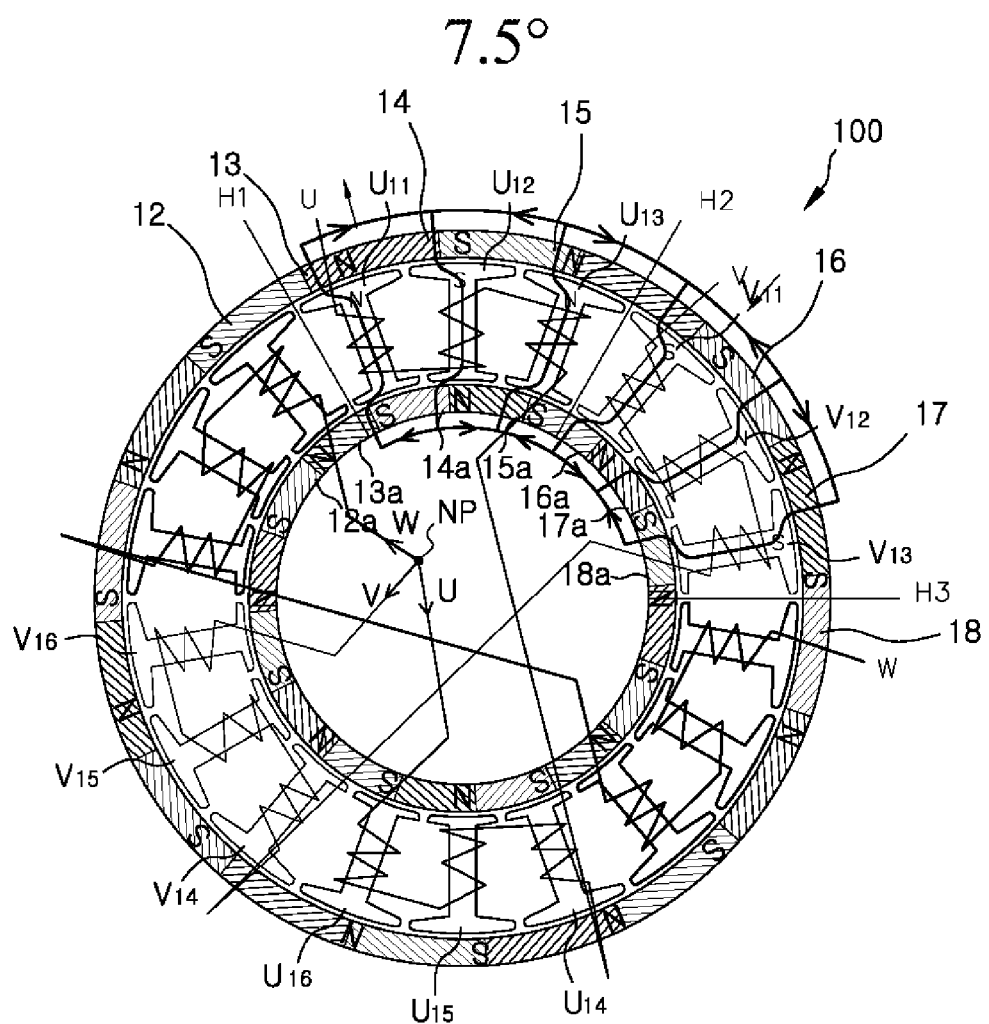
Figure 5:
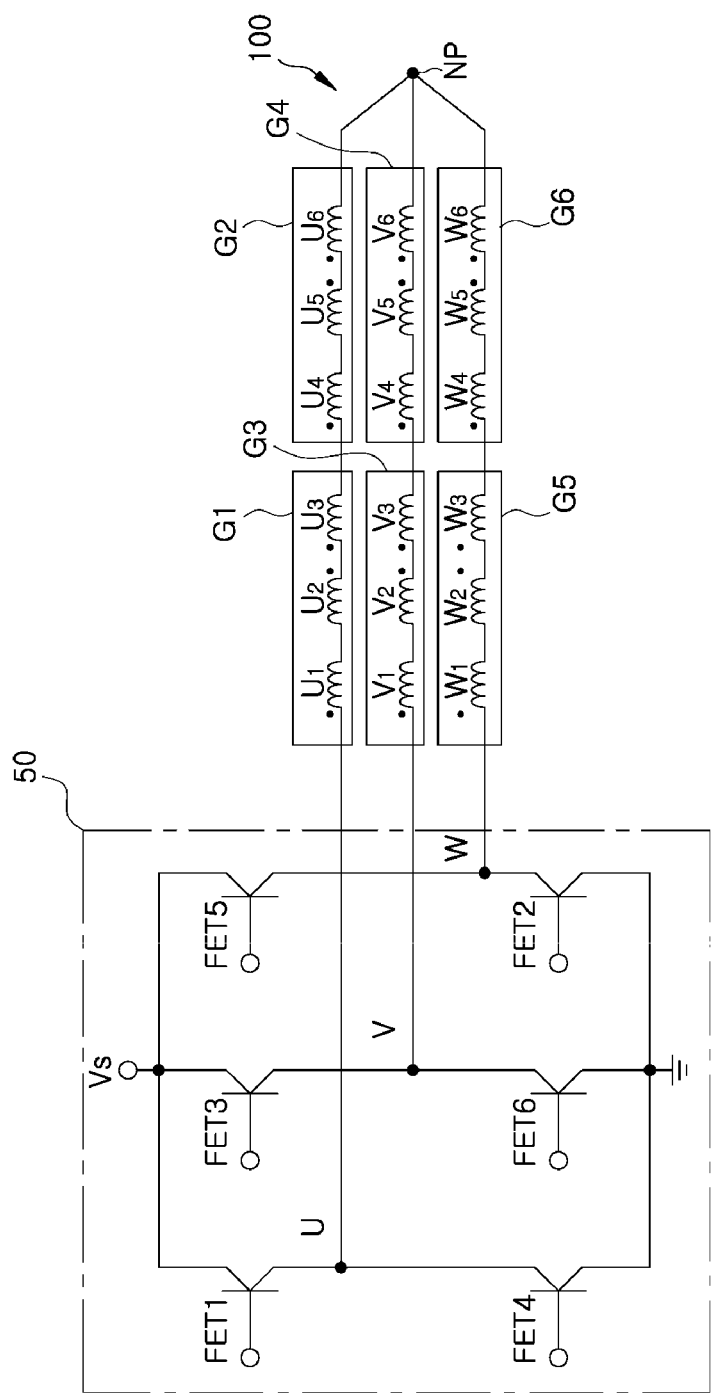
FIG. 5 shows a coil wiring diagram and a motor drive circuit of drive coils of three phases U, V, and W shown in FIG. 4.
Figure 6:
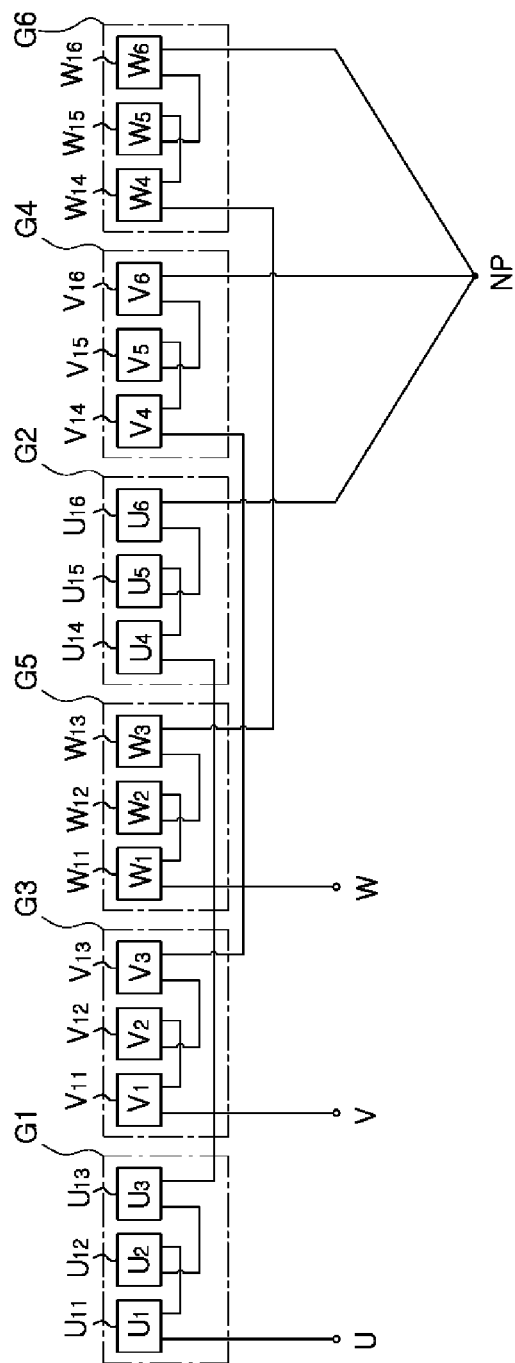
FIG. 6 is a diagram showing a relationship between a placement order and mutual wirings at the time of assembling split cores in the motor shown in FIG. 4.

FIGS. 4A and 4B are diametric cross-sectional views respectively illustrating a brushless direct-current (BLDC) motor of a double rotor structure that is designed as an 18-slot and 16-pole pattern by using a three-coil wiring method according to a first embodiment of the present invention when the rotor is located at an angle of "0°" and "7.5°", respectively. FIG. 5 shows a coil wiring diagram and a motor drive circuit of drive coils of three phases U, V, and W shown in FIG. 4. FIG. 6 is a diagram showing a relationship between a placement order and mutual wirings at the time of assembling split cores in the motor shown in FIG. 4.

Referring to FIGS. 4A to 6, the brushless direct-current (BLDC) motor 100 of a three-coil wiring method according to the first embodiment of the present invention is designed as, for example, an 18-slot and 16-pole pattern by using the three-coil wiring method according to the present invention, and has a structure of a split core type stator 102 (see FIG. 8) and a double rotor 103.

Hereinafter, in the BLDC motor 100 having a split core stator 102 in accordance with the present invention, a method of designing the motor (thereinafter referred to as a three-coil wiring structure motor) in which three split cores are alternately disposed per phase in which coils are wound on each split core per phase, will be described.

First, the setting between slots of the stator and magnets (magnetic poles) of the rotor is set as shown in Equation 2 when designing the three-coil wiring structure motor according to the present invention.

$$\text{The number of magnetic poles} = (\text{the number of slots}/9) \times (9-1) \qquad \text{Equation 2}$$

In Equation 2, the number of slots is determined in a multiple of nine (9). According to Equation 2, the number of slots and poles of the motor, is set at a ratio of, for example, 18-slot and 16-pole, 27-slot and 24-pole, 36-slot and 32-pole, and 45-slot and 40-pole. Thus, since the ratio of the number of slots and the number of poles becomes 12% or so, cogging that occurs during rotation of the rotor may be reduced to about one tenth in comparison with a single-coil wiring method, and a gap between a core and another core (that is, between a slot and another slot) is set narrowly. As a result, an effective area facing each other between each of magnets and each split core increases, to thus increase efficiency of the motor.

In addition, when designing the three-coil wiring structure motor according to the present invention, a rotor position detector for detecting a position signal of the rotor, may be configured, for example, by employing two or three Hall elements, in the case of a three-phase drive system.

When using three Hall elements, angles between the Hall elements H1-H3 are set as shown in Equation 3 or 4.

$$\text{An angle between the Hall elements} = (360°/\text{the number of poles}) \times 2 \pm 3 \qquad \text{Equation 3}$$

$$\text{An angle between the Hall elements} = (360°/\text{the number of slots}) \times 3 \qquad \text{Equation 4}$$

When using two Hall elements, an angle between the Hall elements H1-H2 is set as shown in Equation 5.

$$\text{An angle between the Hall elements} = (360°/\text{the number of poles}) \div 2 \qquad \text{Equation 5}$$

In this case, the rotor position detection of the remaining one Hall element H3 is calculated and applied in software.

It can be set so that Hall elements are arranged in every other three consecutive split cores that are connected with three coils according to the Equation 4, or three Hall elements are arranged in two poles (that is, two magnetic poles) according to Equation 3. In the case that three Hall elements are arranged according to Equation 3, a small-sized printed circuit board (PCB) for assembling Hall elements can be used.

Referring to FIGS. 4A to 6, the brushless direct-current (BLDC) motor of a double rotor structure that is designed according to a three-coil wiring method of the present invention includes: a stator 102 where 18 split cores u11-u16, v11-v16, and w11-w16 are annularly disposed in which coils u1-u6, v1-v6, and w1-w6 are wound on the 18 split cores u11-u16, v11-v16, and w11-w16, respectively; and a double rotor 103 where an inner rotor 103a and an outer rotor 103b are arranged at a distance spaced from each other in which the inner rotor 103a and the outer rotor 103b are formed by alternately disposing N-pole and S-pole magnets at inner and outer sides of the stator 102, respectively, in the case that the BLDC motor employs an 18-slot and 16-pole structure.

In the case of the double rotor 103 including the inner rotor 103a and the outer rotor 103b, the inner rotor 103a and the outer rotor 103b are integrated by a rotor support (not shown), a rotating shaft (not shown) is coupled on a central portion of the inner rotor 103a, and a load is connected to one end of the rotating shaft (not shown).

Magnets 11-26 and 11a-26a facing each other are arranged to have opposite polarities to each other, in the inner rotor 103a and the outer rotor 103b, respectively. Also, annular back yokes (see arrow mark portions) are provided to form magnetic circuits between the adjacent magnets on the inner and outer circumferences of the inner rotor 103a and the outer rotor 103b, respectively, but the detailed description thereof will be omitted for convenience of illustration.

The stator 102 is configured so that six coils u1-u6, v1-v6, and w1-w6 are mutually connected per phase U, V, or W, in which one end (that is, a start terminal) of each phase is connected to U, V, or W outputs of an inverter circuit 50 constituting a motor drive circuit as shown in FIG. 5, and the other end (that is, an end terminal) of each phase is mutually connected to form a neutral point (NP).

The stator coils u1-u6, v1-v6, and w1-w6 form core groups G1-G6 for split cores u11-u16, v11-v16, and w11-w16 of three phases, in which three stator coils u1-u3, v1-v3, w1-w3, u4-u6, v4-v6, or w4-w6 are wound on three split cores u11-u13, v11-v13, w11-w13, u14-u16, v14-v16, or w14-w16, respectively, to thus form a core group G1, . . . , or G6. As shown in FIG. 6, core groups G1-G6 are arranged and assembled per phase U, V, or W. That is, 18 split cores u11-u16, v11-v16, and w11-w16 are assembled in sequence of G1 (u11, u12, u13), G3 (v11, v12, v13), G5 (w11, w12, w13), G2 (u14, u15, u16), G4 (v14, v15, v16), and G6 (w14, w15, w16), and are integrated with a stator support (not shown) by an insert molding method using a resin, to thus be formed in an annular shape. In addition, the split cores u11-u16, v11-v16, and w11-w16 form a cross-coupled structure with insulation bobbins 61-66 (see FIG. 7A) that are formed on the outer circumferences of the cores in order to insulate the stator coils u1-u6, v1-v6, and w1-w6 when the stator coils u1-u6, v1-v6, and w1-w6 are wound on the split cores u11-u16, v11-v16, and w11-w16, to thereby be assembled in an annular shape by using a different assembly method.

In the present invention, in the case of the U-phase core group G1 (u11-u13), coils are wound on three split cores included in each of the core groups, in which the split core u11 is wound in a forward direction, the split core u12 is wound in a reverse direction, and the split core u13 is wound in a forward direction, and thus the split cores within each core group generate magnetic flux in mutually opposite directions to each other. In this case, in the case of the U-phase core group G1 (u11-u13), it is of course possible to wind the split core u11 in a reverse direction, the split core u12 in a forward direction, and the split core u13 in a reverse direction. That is, a coil is wound on a middle core located in the middle of three consecutive cores in the present invention, in the opposite direction to those of coils located in the front and rear ends of the middle core.

In addition, the overall stator 102 is divided into the 18 split cores u11-u16, v11-v16, and w11-w16. As will be described later, alternative drive signals are generated from a controller (not shown) of a motor drive circuit (not shown) so that the magnetic flux is generated between adjacent split cores in mutually opposite directions, and applied to the stator coils u1-u6, v1-v6, and w1 w6 through the inverter circuit 50.

As a method of winding the stator coils u1-u6, v1-v6, and w1-w6 on the split cores u11-u16, v11-v16, and w11-w16, a continuous winding method of winding the stator coils on the six split cores may be employed, or a method of continuously winding the stator coils on groups of the three split cores and mutually connecting the stator coils between the groups of the three split cores may be employed. In addition, it is possible to wind each stator coil on each of the split cores and then mutually connect the stator coils wound on the split cores.

Figure 7A:
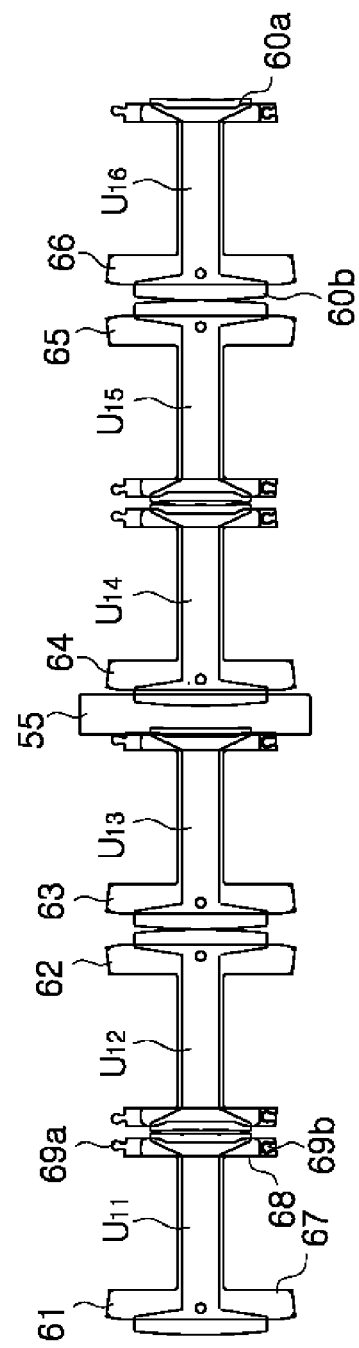
FIG. 7A is a diagram of coupling split cores and jigs for continuous windings in six split cores according to a three-coil wiring method according to the present invention.
Figure 7B:
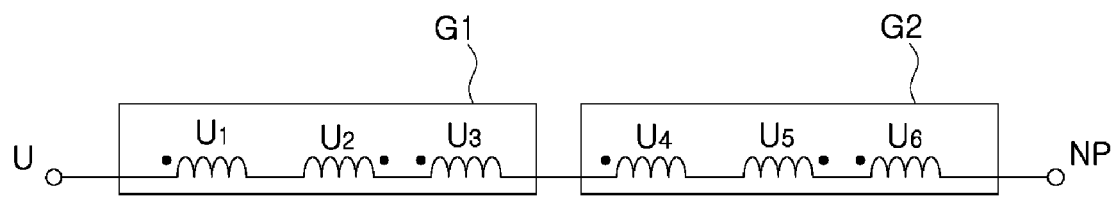
FIG. 7B is a wiring diagram of stator coils that are sequentially wound on six split cores.

FIG. 7A is a diagram of coupling split cores and jigs for continuous windings in six split cores according to a three-coil wiring method according to the present invention, and FIG. 7B is a wiring diagram of stator coils that are sequentially wound on six split cores.

A method of winding coils on the six cores will be described with reference to FIGS. 7A and 7B.

As shown, six U-phase split cores u11-u16 are arranged and assembled in a row, by using five jigs 55 and then a continuous winding may be simply performed by using a winding machine proposed in Korean Patent Registration No. 10-663641 (only one jig is shown but four jigs are not shown in FIG. 7A). In this case, the second and fifth split cores u12 and u15 are arranged in opposite directions to each other and assembled with each other to ensure the reverse windings. Accordingly, coils are continuously wound on the split cores u11-u16, v11-v16, and w11-w16 of each phase in a three-coil wiring method by using a universal winding machine according to a simple winding method and a simple wiring method in the present invention.

As shown in FIGS. 7A and 7B, insulating bobbins 61-66 are integrally formed on the outer circumferences of the split cores u11-u16, v11-v16, and w11-w16 of the present invention, respectively, and outer and inner flanges 67 and 68 are provided on both sides of each of the bobbins 61-66 to set coil winding regions. A coupling projection 69a and a coupling groove 69b that are used for the mutual coupling of the bobbins are formed in the inner flange 68.

Hereinbelow, an operation of the BLDC motor 100 of a double rotor structure designed according to a three-coil wiring method of the present invention will be described with reference to Table 2 and FIGS. 4A through 6. Table 2 illustrates a logic table applied when switching elements FET1-FETE of an inverter circuit is driven.

TABLE 2

| Electrical angle | 0° | 60° | 120° | 180° | 240° | 300° | 360°, 0° |
|---|---|---|---|---|---|---|---|
| Mechanical angle | 0° | 7.5° | 15° | 22.5° | 30° | 37.5° | 45°, 0° |
| H1 | N | S | S | S | N | N | N |
| H2 | N | N | N | S | S | S | N |
| H3 | S | S | N | N | N | S | S |
| input | V | V | W | W | U | U | V |
| Output | W | U | U | V | V | W | W |
| Upper FET | FET3 | FET3 | FET5 | FET5 | FET1 | FET1 | FET3 |
| Tower FET | FET2 | FET4 | FET4 | FET6 | FET6 | FET2 | FET2 |

Figure 8:
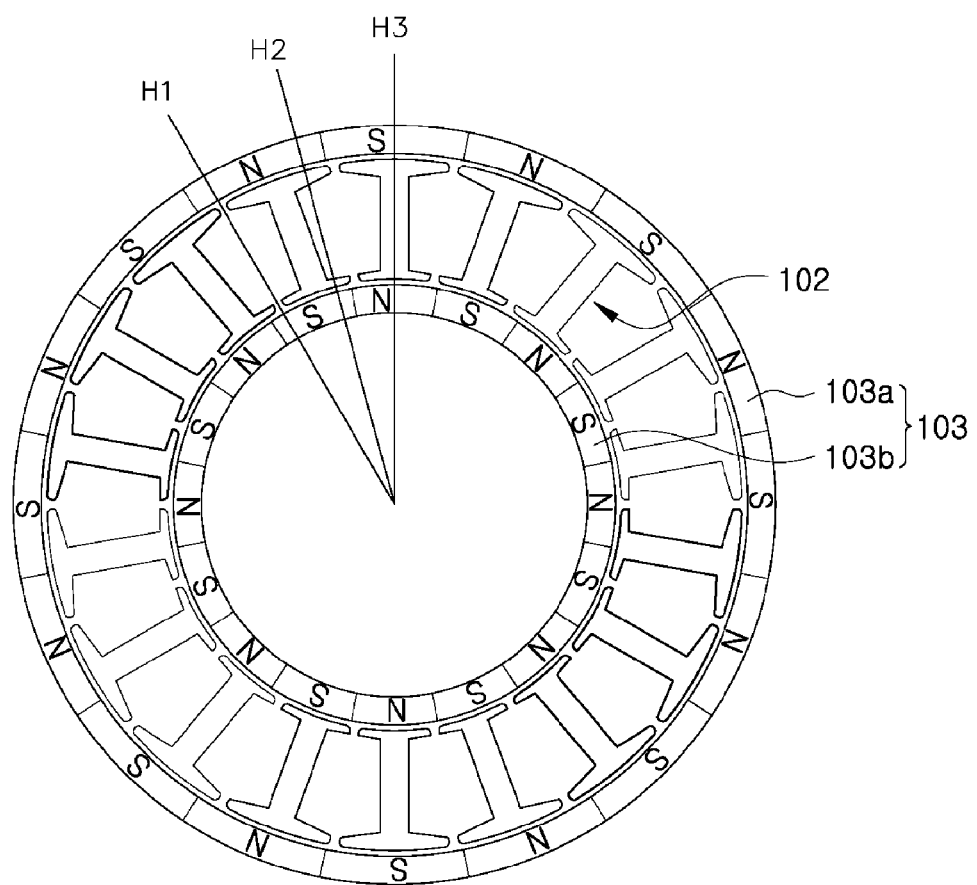
FIG. 8 is a diametric cross-sectional view for explaining a placement position of Hall elements deformed according to the present invention when the rotor is positioned at an angle of "0°".

In the present invention, three Hall elements H1-H3 are arranged for every other three slots, that is, per 60° and thus placed over a 120° range, according to the Equation 4, as shown in FIG. 4A, or three Hall elements H1-H3 are arranged per 15° that is calculated according to Equation 3 and thus placed over a 30° range, as shown in FIG. 8.

As described above, by minimizing the spacing between the positions of the Hall elements H1-H3 for detecting the rotor position signals according to Equation 3, in the present invention, it is possible to miniaturize the size of a printed circuit board (PCB) for a Hall element assembly in which the Hall elements H1-H3 are assembled.

That is, in the case of a typical prior art motor of the 18-slot structure of the single-coil wiring structure, a PCB for a Hall element assembly in which the three Hall elements are assembled is manufactured to a size that covers an angle range of 40°. In the case of a typical prior art motor of the 24-slot structure of the two-coil wiring structure, a PCB for a Hall element assembly in which the three Hall elements are assembled is manufactured to a size that covers an angle range of 60°. However, in the case of a motor of the 18-slot structure of the three-coil wiring structure, according to the present invention, a PCB for a Hall element assembly is manufactured to a size that covers an angle range of 30° and thus may be made in compact size.

The Hall elements H1-H3 detect the magnetic poles (N-poles or S-poles) in the rotors 103a and 103b by each step and transmit the detected results to the motor driving circuit.

The motor illustrated in FIG. 4A shows a state when the angle is 0°. The directions of the currents flowing through the stator coils u1-u6, v1-v6, and w1-w6 per mechanical angle of 7.5° in a six-step mode are changed and the currents whose flowing directions have been changed are applied to the stator coils u1-u6, v1-v6, and w1-w6, to thereby activate the corresponding split cores u11-u16, v11-v16, and w11-w16 and to thus generate the rotating magnetic field.

The motor driving circuit (not shown) includes a controller (not shown) and an inverter circuit 50. The inverter circuit 50 is configured to include three pairs of power switching transistors FET1-FETE that are connected in a totem pole structure, respectively, in which an output of each phase U, V, or W occurs from a junction between each of the upper switching transistors FETs that are FET1, FET3, and FET5 and each of the lower switching transistors FETs that are FET4, FETE, and FET2 corresponding to the upper switching transistors FETs that are FET1, FET3, and FET5, respectively, to thus be applied to the stator coils u1-u6, v1-v6, and w1-w6 of the motor 100.

When the motor 100 employs a three-phase drive method, the stator 102 includes three coils u1-u6, v1-v6, and w1-w6. For example, in the case of a star connection structure, each one end of each one coil is interconnect with each other end of each other coil, to thus form a neutral point (NP).

The BLDC motor 100 is configured so that the rotor is rotated in accordance with generation of the rotating magnetic field by sequentially exciting the two-phase stator coils when two switching elements of three pairs of switching elements connected in a totem pole structure are selectively driven on the basis of the position signal of the rotor 103, and currents are sequentially applied to the two-phase stator coils among the U-phase, V-phase, and W-phase coils u1-u6, v1-v6, and w1-w6. In other words, a drive signal is applied to the one-phase coil from the output of the inverter circuit 50, and another drive signal is applied to the other coil via the neutral point (NP).

When the position signals of the rotors 103a and 103b are detected by the Hall elements H1-H3 at each of angles in the controller (not shown) of the motor driving circuit (not shown), the inverter circuit 50 turns on one pair of switching elements FETs in accordance with Table 2 to thereby set a current flow path.

For example, as shown in FIG. 4A, the Hall elements H1-H3 detect the polarity of the outer rotor 103b as "N, N, S", the controller (not shown) judges that the rotational position of the double rotor 103 is regarded as 0°, and applies drive signals to turn on the upper switching transistor FET3 and the lower switching transistor FET2. Accordingly, a current flows to ground via FET3, V-phase coils (v1-v3), V-phase coils (v4-v6), W-phase coils (w6-w4), W-phase coils (w3-w1), and FET2.

Accordingly, magnetic flux is generated in an inner direction of the split core v11, magnetic flux is generated in an outer direction of the split core v12, and magnetic flux is generated in an inner direction of the split core v13. Thus, a magnetic circuit is set as indicated by arrows of FIG. 4A, and the double rotor 103 is rotated clockwise in which the internal rotor 103a and the external rotor 103b are set as the N-pole and S-pole magnets to face each other.

In other words, in the BLDC motor 100 of FIG. 4A, the three-coil wired split cores v11-v13 face each other with an identical polarity in the form of the magnetic poles such as S-S, N-N, and S-S between the opposing magnets 16-18 of the outer rotor 103b, at the right portion of the outer side of the split cores v11-v13, and face each other with an identical polarity in the form of the magnetic poles such as N-N, S-S, N-N between the opposing magnets 16a-18a of the inner rotor 103a, at the right portion of the inner side of the split cores v11-v13. Accordingly, a repulsive force is generated between each of the split cores v11-v13 and the double rotor 103.

In addition, the three-coil wired split cores v11-v13 face each other with an opposing polarity to each other in the form of the magnetic poles such as N-S, S-N, and N-S between the opposing magnets 15-17 of the outer rotor 103b, at the left portion of the outer side of the split cores v11-v13, in which the left portion of the outer side of the split cores is relatively smaller than the right portion thereof, and face each other with an opposing polarity to each other in the form of the magnetic poles such as S-N, N-S, S-N between the opposing magnets 15a-17a of the inner rotor 103a, at the left portion of the inner side of the split cores v11-v13. Accordingly, an attractive force is generated between each of the split cores v11-v13 and the double rotor 103.

Accordingly, both a small attractive force and a large repulsive force are generated between each of the split cores v11-v13 and the double rotor 103 and an action of rotating the double rotor 103 in a clockwise direction takes place.

Further, the three-coil wired split cores w11-w13 that are adjacent to and disposed at the rear end of the three-coil wired split cores v11-v13 face each other with an opposing polarity to each other in the form of the magnetic poles such as S-N, N-S, and S-N between the opposing magnets 18-20 of the outer rotor 103b, at the left portion of the outer side of the split cores w11-w13, face each other with an identical polarity in the form of the magnetic poles such as N-N, S-S, N-N between the opposing magnets 19-21 of the outer rotor 103b, at the right portion of the outer side of the split cores w11-w13, face each other with an opposing polarity to each other in the form of the magnetic poles such as N-S, S-N, and N-S between the opposing magnets 18a-20a of the inner rotor 103a, at the left portion of the inner side of the split cores w11-w13, and face each other with an identical polarity in the form of the magnetic poles such as N-N, S-S, N-N between the opposing magnets 19a-21a of the inner rotor 103a, at the right portion of the inner side of the split cores w11-w13. Accordingly, the attractive force and repulsive force are generated between each of the split cores w11-w13 and the double rotor 103 and thus an action of rotating the double rotor 103 in a clockwise direction takes place.

In addition, in the same manner as the above-described case, the attractive force and repulsive force are generated between the split cores v14-v16 and the double rotor 103 and between each of the split cores w14-w16 and the double rotor 103, and thus the double rotor 103 is rotated in a clockwise direction by an action of repelling (or pushing) and attracting (or pulling) the double rotor 103.

Referring to FIG. 4B, the Hall elements H1-H3 detect the polarity of the outer rotor 103b as "S, N, S", the controller (not shown) judges that the rotational position of the double rotor 103 is regarded as 7.5° as a mechanical angle, and applies drive signals to turn on the upper switching transistor FET3 and the lower switching transistor FET4. Accordingly, a current flows to ground via FET3, V-phase coils (v1-v3), V-phase coils (v4-v6), W-phase coils (w6-w4), W-phase coils (w3-w1), and FET4.

Accordingly, magnetic flux is generated in an inner direction of the split core v11, magnetic flux is generated in an outer direction of the split core v12, and magnetic flux is generated in an inner direction of the split core v13. Thus, a magnetic circuit is set as indicated by arrows of FIG. 4B, and the double rotor 103 is rotated clockwise in which the internal rotor 103a and the external rotor 103b are set as the N-pole and S-pole magnets to face each other.

In other words, in the BLDC motor 100 of FIG. 4B, the three-coil wired split cores v11-v13 face each other with an opposing polarity to each other in the form of the magnetic poles such as N-S, S-N, and N-S between the opposing magnets 15-17 of the outer rotor 103b, at the left portion of the outer side of the split cores v11-v13, face each other with an identical polarity in the form of the magnetic poles such as N-N, S-S, N-N between the opposing magnets 16-18 of the outer rotor 103b, at the right portion of the outer side of the split cores v11-v13, face each other with an opposing polarity to each other in the form of the magnetic poles such as S-N, N-S, and S-N between the opposing magnets 15a-17a of the inner rotor 103a, at the left portion of the inner side of the split cores v11-v13, and face each other with an identical polarity in the form of the magnetic poles such as S-S, N-N, S-S between the opposing magnets 16a-18a of the inner rotor 103a, at the right portion of the inner side of the split cores v11-v13. Accordingly, an attractive force and a repulsive force are generated between each of the split cores v11-v13 and the double rotor 103, and thus an action of rotating the double rotor 103 in a clockwise direction takes place.

Further, the three-coil wired split cores u11-u13 that are adjacent to and disposed at the rear end of the three-coil wired split cores v11-v13 face each other with an opposing polarity to each other in the form of the magnetic poles such as S-N, N-S, and S-N between the opposing magnets 12-15 of the outer rotor 103b, at the left portion of the outer side of the split cores u11-u13, face each other with an identical polarity in the form of the magnetic poles such as N-N, S-S, N-N between the opposing magnets 13-15 of the outer rotor 103b, at the right portion of the outer side of the split cores u11-u13, face each other with an opposing polarity to each other in the form of the magnetic poles such as N-S, S-N, and N-S between the opposing magnets 12a-15a of the inner rotor 103a, at the left portion of the inner side of the split cores u11-u13, and face each other with an identical polarity in the form of the magnetic poles such as S-S, N-N, S-S between the opposing magnets 12a-15a of the inner rotor 103a, at the right portion of the inner side of the split cores u11-u13. Accordingly, the attractive force and repulsive force are generated between each of the split cores u11-u13 and the double rotor 103 and thus an action of rotating the double rotor 103 in a clockwise direction takes place.

In addition, in the same manner as the above-described case, the attractive force and repulsive force are generated between each of the split cores v14-v16 and the double rotor 103 and between each of the split cores u14-u16 and the double rotor 103, and thus the double rotor 103 is rotated in a clockwise direction by an action of repelling (or pushing) and attracting (or pulling) the double rotor 103.

As described above, a coil is wound in a reverse direction around a core positioned in the middle of three consecutive cores in each core group G1-G6 in the present invention, and two adjacent core groups, that is, a pair of six consecutive split cores that are disposed symmetrically at both sides around the rotating shaft in every driving step are activated and three consecutive split cores that are disposed between the pair of six consecutive split cores are inactivated.

In this case, when drive signals are applied to every other two adjacent core groups and thus activated, six split cores included in the two core groups generate the magnetic flux in the opposite directions to each other. Further, one drive signal is applied to one of the adjacent core groups that are activated from a start terminal of the corresponding coil, and the other drive signal is applied to the other of the adjacent core groups from an end terminal of the corresponding coil.

In this case, the six consecutive split cores included in a pair of the core groups that have been activated pull (or attract) the double rotor 103 in the direction of rotation of the rotor by an attractive force that is caused when the left sides of outer and inner flanges 60b and 60a are set to polarities opposite to each other, and push (or repel) the double rotor 103 in the direction of rotation of the rotor by a repulsive force that is caused when the right sides of the outer and inner flanges 60b and 60a are set to a polarity identical to each other.

That is, all of the three consecutive split cores of each of the four core groups generate the magnetic flux of rotating the opposing magnets of the double rotor 103 in an identical direction to thus enable effective force transmission.

In the present invention, an effective magnetic circuit path is set at no loss of the magnetic flux even when a boundary surface is disposed between the adjacent S-pole and N-pole magnets in the double rotor 103 opposing both end portions of the split core, to thus rotationally drive the double rotor 103. As a result, split magnetized magnets can be used without rounding corners of the adjacent S-pole and N-pole magnets, to thereby enlarge an effective area of magnets 11-16 and 11a-26a corresponding to the split cores u11-u16, v11-v16, and w11-w16, and to thus increase efficiency of the motor.

In addition, coils are wound on the six consecutive split cores included in a pair of the core groups in the present invention so that the magnetic flux is generated between the adjacent split cores in the opposite directions to each other, and drive signals are applied to the coils. Accordingly, although a gap between cores is set small, leakage of the magnetic flux does not occur due to cogging. In addition, an effective area between a magnet and a core is increased, to thereby reduce leaking magnetic flux and to thus increase efficiency of the motor.

Although the conventional art requires that an opening width between slots should be large and an outer circumferential surface should be rounded, the inner and outer flanges 60a and 60b of the respective split core u11-u16, v11-v16, and w11-w16 are not be rounded in the present invention. In addition, as shown in FIGS. 4A and 4B, even if a curvature is set to match to an inner circle and an outer circle formed by a whole of the 18 split cores, cogging is not significantly caused. As a result, an effective area between a magnet and a core is increased, to thereby reduce leaking magnetic flux and to thus increase efficiency of the motor.

Meanwhile, the present invention can be applied to a double rotor type BLDC motor according to the first embodiment, as well as a single rotor type BLDC motor in an identical principle.

Figure 9A:
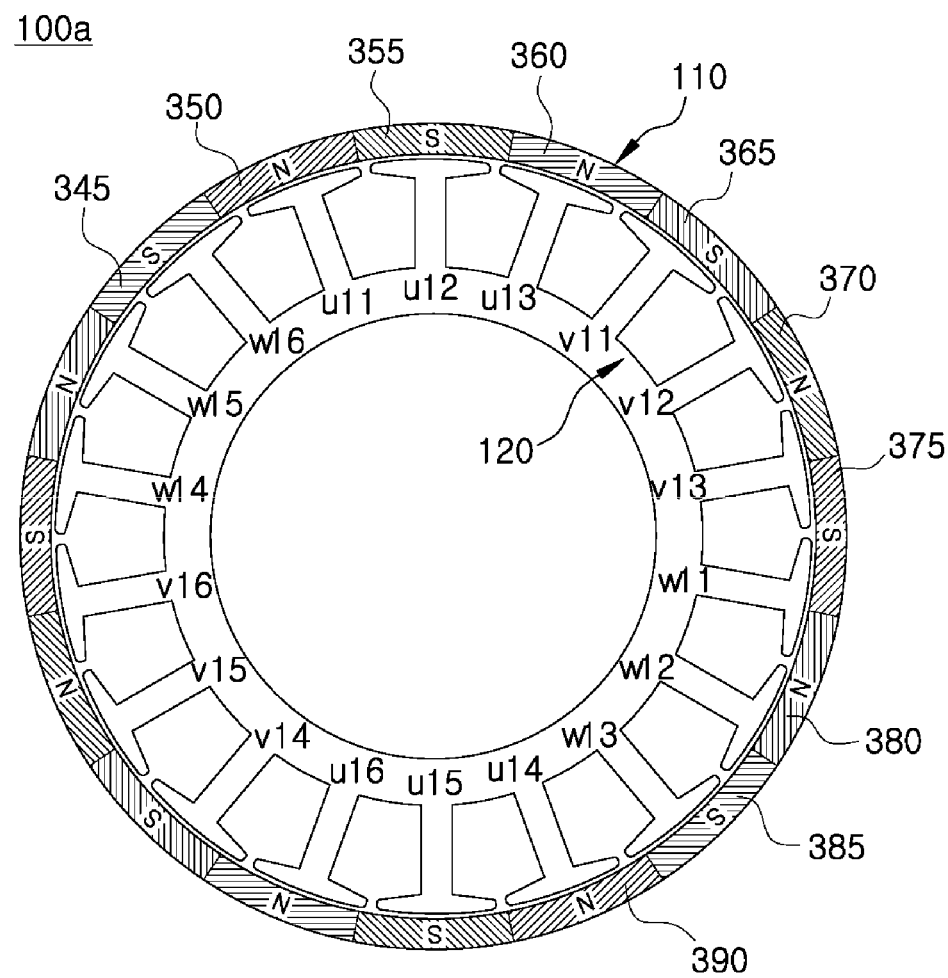
FIG. 9A is a diametric cross-sectional view illustrating a single rotor type brushless direct-current (BLDC) motor using a stator of a three-coil wiring structure in which coils are wound on an integral core by a three-coil wiring method according to a second embodiment of the present invention.
Figure 9B:
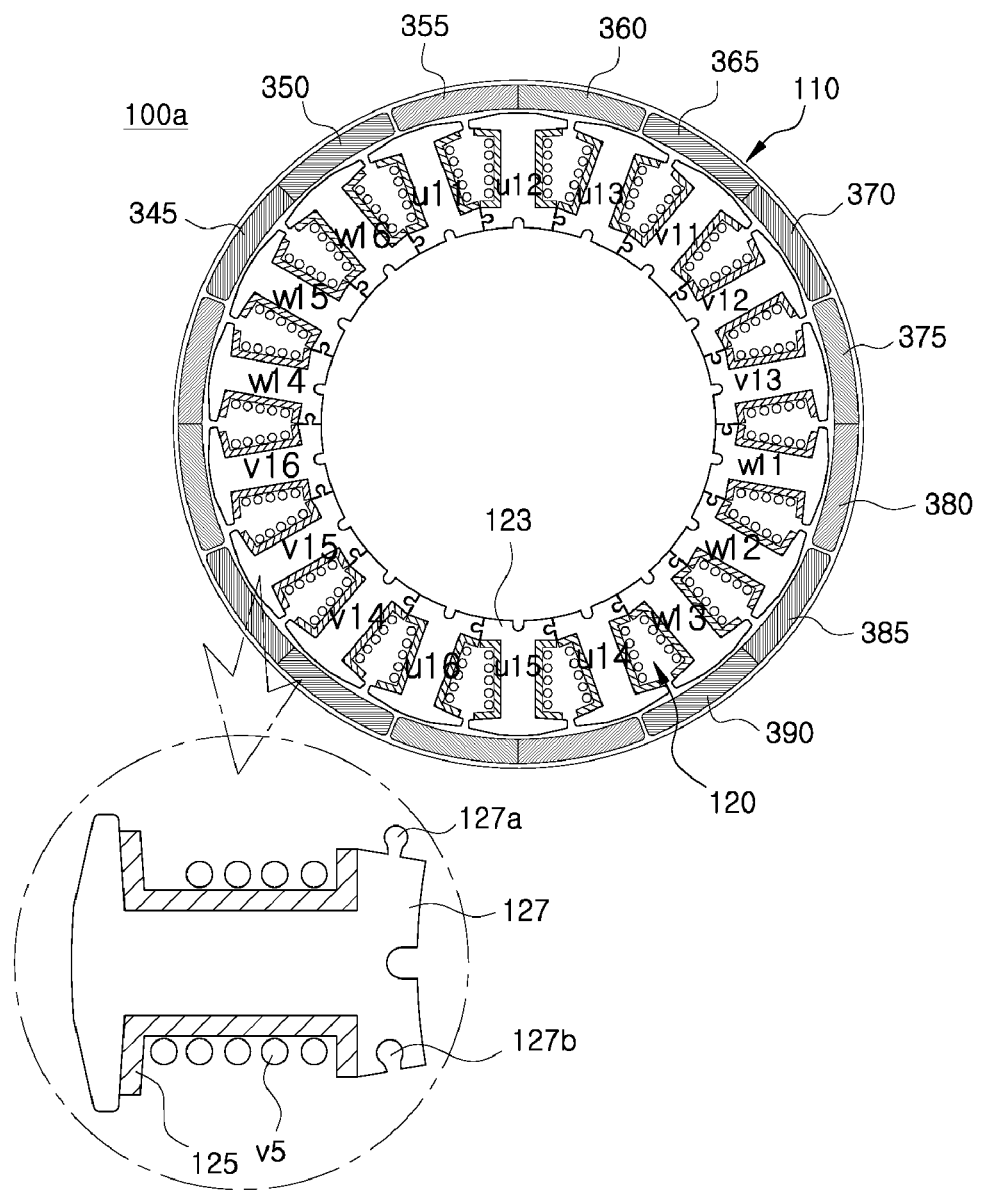
FIG. 9B is a diametric cross-sectional view illustrating a single rotor type brushless direct-current (BLDC) motor using a stator of a three-coil wiring structure in which coils are wound on split cores by a three-coil wiring method according to a second embodiment of the present invention.
Figure 10:
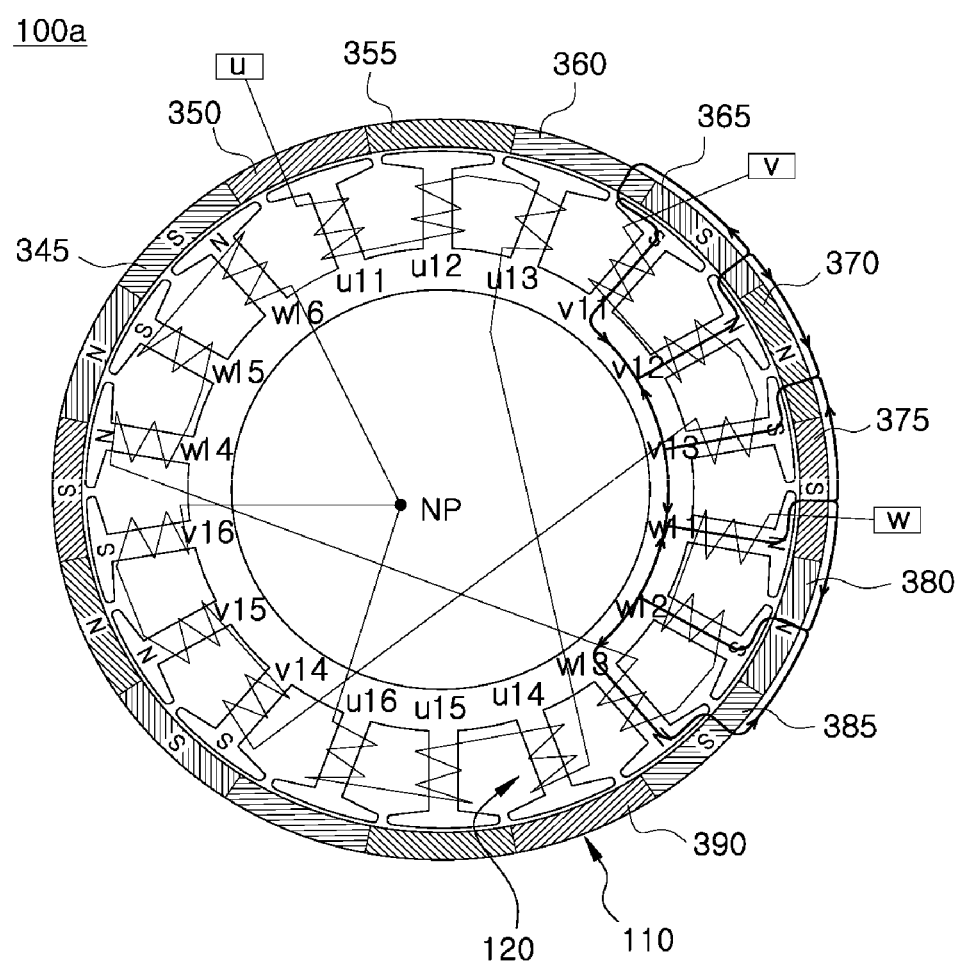
FIG. 10 is a diametric cross-sectional view illustrating a single rotor type brushless direct-current (BLDC) motor using a stator of a three-coil wiring structure according to a second embodiment of the present invention when the rotor is positioned at an angle of "0°".

FIG. 9A is a diametric cross-sectional view illustrating a single rotor type brushless direct-current (BLDC) motor using a stator of a three-coil wiring structure in which coils are wound on an integral core by a three-coil wiring method according to a second embodiment of the present invention. FIG. 9B is a diametric cross-sectional view illustrating a single rotor type brushless direct-current (BLDC) motor using a stator of a three-coil wiring structure in which coils are wound on split cores by a three-coil wiring method according to a second embodiment of the present invention. FIG. 10 is a diametric cross-sectional view illustrating a single rotor type brushless direct-current (BLDC) motor using a stator of a three-coil wiring structure according to a second embodiment of the present invention when the rotor is positioned at an angle of "0°".

Referring to FIGS. 9A and 9B, a single rotor type BLDC motor according to a second embodiment of the present invention, may include, a stator 120 and a rotor 110 that is arranged at a gap at the outside of the stator 120, as a motor of an 18-slot and 16-pole structure, for example. In the description of the second embodiment shown in FIGS. 9A and 9B, an outer rotor type motor in which a rotor is disposed at the outside of the stator has been described as an example, but the present invention may be applied to an inner rotor type motor in which a rotor is disposed at the inside of the stator.

The rotor 110 may be implemented to include magnets, that is, poles 345 to 390 having a plurality of, for example, sixteen (16) different polarities, that is, N-poles and S-poles that are sequentially attached to a back yoke (not shown) in an annular shape.

The stator 120 may be implemented into an integral core where a plurality of, for example, eighteen (18) teeth u11 to w16 whose leading ends are fabricated in a T-shaped form are radially extended from an annular back yoke, as shown in FIG. 9A, or may be implemented into a plurality of, for example, eighteen (18) split cores u11 to w16 whose leading ends are fabricated in a T-shaped form and whose rear ends are mutually connected to form an annular back yoke, as shown in FIG. 9B.

As described above, in the stator 120 according to the present invention, cores around which coils are wound and that forms a magnetic circuit path may be implemented into an integral core or split cores.

Thus, at the time of describing the second embodiment, for convenience of explanation, the teeth, the split cores, the slots formed between the teeth are used in an identical sense to each other, except in special cases and are assigned with the same reference numerals u11 to w16 as the split cores.

The stator 120 that is implemented by assembling a plurality of, for example, eighteen (18) split cores u11 to w16 can reduce the material cost of the cores. In addition, a general-purpose winding machine is used to wind coils on three or six cores (or teeth) in a three-coil wiring method, rather than a dedicated winding machine, in accordance with the present invention. Thus, windings can be done in a continuous wiring method, to thus reduce the manufacturing cost. However, in the case of a split core structure, it is necessary to go through the processes of winding coils on the split cores, respectively, and assembling the split cores.

The number of magnets (or poles) and the number of teeth (or slots) that implements a rotor 110 contained in the BLDC motor of a single rotor type may have the number of various different combinations. The combination of the number of slots and the number of poles that implements the BLDC motor of a single rotor type is determined according to Equation 2.

In the second embodiment of the present invention, a single rotor type BLDC motor that is implemented in an 18-slot and 16-pole pattern for convenience of explanation will now be described as an example.

The brushless direct-current (BLDC) motor of a single rotor structure according to the present invention includes: a stator 120 where 18 split cores u11-u16, v11-v16, and w11-w16 are annularly disposed in which coils u1-u6, v1-v6, and w1-w6 are wound on the 18 split cores u11-u16, v11-v16, and w11-w16, respectively; and a rotor 110 that is implemented in an annular form by alternately disposing N-pole and S-pole magnets at outer sides of the stator 120, in the case that the BLDC motor employs an 18-slot and 16-pole structure.

Hereinafter, in the BLDC motor 100 having a split core type stator 120 in accordance with the present invention, a method of designing a motor (hereinafter referred to as a three-coil wiring structure motor) will be described as shown in FIG. 9B, in which three split cores are alternately disposed per phase and coils are wound on each split core per phase.

As will be described later, when the single rotor type BLDC motor according to the second embodiment is compared with the double rotor type BLDC motor according to the first embodiment, the former differs from the latter, in that a single rotor is used in place of a double rotor, and a rear end of teeth opposing magnets forms an annular back yoke so as to form a magnetic circuit, instead of a plurality of split cores that are arranged at intervals. There is no great difference in remaining structural portions and an operating principle of the present invention.

That is, a combination ratio between number of slots in a stator and the number of magnets (or magnetic poles) in a rotor, a three-coil wiring method of winding coils on split cores of the stator, a method of disposing split cores on which coils are wound, and a method of driving a motor, are substantially the same between the first and second embodiments.

Thus, at the time of explaining the second embodiment briefly, the description of the same portions as those of the first embodiment will be omitted or simplified.

First, a combination between the number of slots of the stator and the number of magnets (magnetic poles) of the rotor is set as shown in Equation 2 when designing the three-coil wiring structure motor according to the present invention.

In the same manner as that of the double rotor type motor of the first embodiment, the number of slots of the single rotor type motor of the second embodiment, is determined in a multiple of nine (9). According to Equation 2, the number of slots and poles of the motor, is set at a ratio of, for example, 18-slot and 16-pole, 27-slot and 24-pole, 36-slot and 32-pole, and 45-slot and 40-pole. Thus, since the ratio of the number of slots and the number of poles becomes 12% or so, cogging that occurs during rotation of the rotor may be reduced to about one tenth in comparison with a single-coil wiring method, and a gap between a core and another core (that is, between a slot and another slot) is set narrowly. As a result, an effective area facing each other between each of magnets and each split core increases, to thus increase efficiency of the motor.

In addition, when designing the three-coil wiring structure motor according to the present invention, a rotor position detector for detecting a position signal of the rotor, may be configured, for example, by employing two or three Hall elements, in the case of a three-phase drive system.

When using three Hall elements, angles between the Hall elements H1-H3 are set as shown in the above-described Equation 3 or 4.

When using two Hall elements, an angle between the Hall elements H1-H2 is set as shown in Equation 5. In this case, the rotor position detection of the remaining one Hall element H3 is calculated and applied in software.

It can be set so that Hall elements are arranged in every other three consecutive teeth (or split cores) that are connected with three coils according to the Equation 4, or three Hall elements are arranged in two poles (that is, the two magnetic poles) according to Equation 3. In the case that three Hall elements are arranged according to Equation 3, a small-sized printed circuit board (PCB) for assembling Hall elements can be used.

Referring to FIGS. 9A and 9B, a rotor 110 of the second embodiment of the present invention has substantially the same structure as that of the first embodiment of the present invention, a rotating shaft (not shown) is coupled on a central portion of the rotor 110, by a rotor support (not shown), and a load is connected to one end of the rotating shaft (not shown).

N-pole magnets 350, 360, 370, 380, and 390 and S-poles magnets 345, 355, 365, 375, and 385 are alternately arranged in the rotor 110. Also, annular back yokes (see arrow mark portions) are provided to form magnetic circuits between the adjacent magnets on the circumferences of the rotor 110, respectively, but the detailed description thereof will be omitted for convenience of explanation.

The stator 120 is configured so that six coils u1-u6, v1-v6, and w1-w6 are mutually connected per phase U, V, or W, in which one end (that is, a start terminal) of each phase is connected to U, V, or W outputs of an inverter circuit 50 constituting a motor drive circuit as shown in FIG. 5, and the other end (that is, an end terminal) of each phase is mutually connected to form a neutral point (NP).

The stator coils u1-u6, v1-v6, and w1-w6 form core groups G1-G6 for split cores u11-u16, v11-v16, and w11-w16 of three phases, in which three stator coils u1-u3, v1-v3, w1-w3, u4-u6, v4-v6, or w4-w6 are wound on three split cores u11-u13, v11-v13, w11-w13, u14-u16, v14-v16, or w14-w16, respectively, to thus form a core group G1, . . . , or G6. As shown in FIG. 6, core groups G1-G6 are arranged and assembled per phase U, V, or W. That is, 18 split cores u11-u16, v11-v16, and w11-w16 are assembled in sequence of G1 (u11, u12, u13), G3 (v11, v12, v13), G5 (w11, w12, w13), G2 (u14, u15, u16), G4 (v14, v15, v16), and G6 (w14, w15, w16), and the inner circumferences of the split cores are mutually engaged and integrated with each other, to thus be formed in an annular shape as shown in FIG. 9B.

As shown in FIG. 9B, the split cores u11-u16, v11-v16, and w11-w16 may be implemented into a plurality of, for example, eighteen (18) split cores forming an annular back yoke 123, in which the leading portions of the respective split cores are formed in a T-shaped form so as to form winding areas on which coils are wound, and body portions 127 of the rear end portions thereof are mutually connected, thereby forming the annular back yoke 123. The body portions 127 of the split cores can be mutually assembled with a variety of coupling structures, for example, coupling protrusions 127a and coupling recesses 127b that are formed at the ends of the body portions when the annular back yoke 123 is formed.

In addition, the split cores u11-u16, v11-v16, and w11-w16 form insulation bobbins 125 (see FIG. 9B) in an integral form on the outer circumferences of the split cores in order to insulate the stator coils u1-u6, v1-v6, and w1-w6 when the stator coils u1-u6, v1-v6, and w1-w6 are wound on the split cores u11-u16, v11-v16, and w11-w16. Furthermore, each of the insulation bobbins 125 includes upper and lower bobbins and can be coupled to the mutually assembled split cores.

Further, when a plurality of split cores u11-u16, v11-v16, and w11-w16 are assembled in an annular form, the split cores are not mutually assembled with coupling protrusions 127a and coupling recesses 127b, but body portions 127 are interconnected to each other to thus form an annular back yoke 123 and thereby also mutually assemble the split cores with coupling protrusions and coupling recesses added in the insulation bobbins 125.

In the present invention, in the case of the U-phase core group G1 (u11-u13), coils are wound on three split cores included in each of the core groups, in which the split core u11 is wound in a forward direction, the split core u12 is wound in a reverse direction, and the split core u13 is wound in a forward direction, and thus the split cores within each core group generate magnetic flux in mutually opposite directions to each other.

In addition, the overall stator 120 is divided into the 18 split cores u11-u16, v11-v16, and w11-w16. As will be described later, alternative drive signals are generated from a controller (not shown) of a motor drive circuit (not shown) so that the magnetic flux is generated between adjacent split cores in mutually opposite directions, and applied to the stator coils u1-u6, v1-v6, and w1 w6 through the inverter circuit 50.

As a method of winding the stator coils u1-u6, v1-v6, and w1-w6 on the split cores u11-u16, v11-v16, and w11-w16, a continuous winding method of winding the stator coils on the six split cores may be employed, or a method of continuously winding the stator coils on groups of the three split cores and mutually connecting the stator coils between the groups of the three split cores may be employed. In addition, it is possible to wind each of the stator coils on each of the split cores and then mutually connect the stator coils wound on the split cores.

Since a method of winding coils on six split cores is substantially the same as that of the first embodiment of the present invention shown in FIGS. 7A and 7B, the detailed description thereof will be omitted.

The insulation bobbins 125 are integrally formed on the respective outer circumferences of the split cores u11-u16, v11-v16, and w11-w16 of the present invention, and each of the insulation bobbins 125 includes outer and inner flanges at both ends so as to set coil winding areas.

Hereinbelow, an operation of the BLDC motor 100a of a single rotor structure designed according to a three-coil wiring method of the present invention will be described with reference to FIG. 10. In the same manner as the first embodiment, switching elements FET1-FETE of an inverter circuit are driven by using a logic table of Table 2 according to the second embodiment.

In the second embodiment of the present invention, three Hall elements H1-H3 are arranged for every other three slots, that is, per 60° and thus placed over a 120° range, according to Equation 4, or three Hall elements H1-H3 are arranged per 15° that is calculated according to Equation 3 and thus placed over a 30° range.

As described above, by minimizing the spacing between the positions of the Hall elements H1-H3 for detecting the rotor position signals according to Equation 3, in the present invention, it is possible to miniaturize the size of a printed circuit board (PCB) for a Hall element assembly in which the Hall elements H1-H3 are assembled.

That is, in the case of a typical prior art motor of the 18-slot structure of the single-coil wiring structure, a PCB for a Hall element assembly in which the three Hall elements are assembled is manufactured to a size that covers an angle range of 40°. In the case of a typical prior art motor of the 24-slot structure of the two-coil wiring structure, a PCB for a Hall element assembly in which the three Hall elements are assembled is manufactured to a size that covers an angle range of 60°. However, in the case of a motor of the 18-slot structure of the three-coil wiring structure, according to the present invention, a PCB for a Hall element assembly is manufactured to a size that covers an angle range of 30° and thus may be made in compact size.

The Hall elements H1-H3 detect the magnetic poles (N-poles or S-poles) in the rotor 110 by each step and transmit the detected results to the motor driving circuit.

The motor illustrated in FIG. 10 shows a state when the angle is 0°. The directions of the currents flowing through the stator coils u1-u6, v1-v6, and w1-w6 per mechanical angle of 7.5° in a six-step mode are changed and the currents whose flowing directions have been changed are applied to the stator coils u1-u6, v1-v6, and w1-w6, to thereby activate the corresponding split cores u11-u16, v11-v16, and w11-w16 and to thus generate the rotating magnetic field.

As shown in FIG. 5, the motor driving circuit (not shown) includes a controller (not shown) and an inverter circuit 50. When the motor 100a employs a three-phase drive method, the stator 120 includes three coils u1-u6, v1-v6, and w1-w6. For example, in the case of a star connection structure, each one end of each one coil is interconnect with each other end of each other coil, to thus form a neutral point (NP).

The BLDC motor 100a is configured so that the rotor is rotated in accordance with generation of the rotating magnetic field by sequentially exciting the two-phase stator coils when two switching elements of three pairs of switching elements connected in a totem pole structure are selectively driven on the basis of the position signal of the rotor 110, and currents are sequentially applied to the two-phase stator coils among the U-phase, V-phase, and W-phase coils u1-u6, v1-v6, and w1-w6. In other words, a drive signal is applied to the one-phase coil from the output of the inverter circuit 50, and another drive signal is applied to the other coil via the neutral point (NP).

When the position signals of the rotor 110 are detected by the Hall elements H1-H3 at each of angles in the controller (not shown) of the motor driving circuit (not shown), the inverter circuit 50 turns on one pair of switching elements FETs in accordance with Table 2 to thereby set a current flow path.

For example, as shown in FIG. 10, the Hall elements H1-H3 detect the polarity of the rotor 110 as "N, N, S", the controller (not shown) judges that the rotational position of the rotor 110 is regarded as 0°, and applies drive signals to turn on the upper switching transistor FET3 and the lower switching transistor FET2. Accordingly, a current flows to ground via FET3, V-phase coils (v1-v3), V-phase coils (v4-v6), W-phase coils (w6-w4), W-phase coils (w3-w1), and FET2.

Accordingly, magnetic flux is generated in an inner direction of the split core v11, magnetic flux is generated in an outer direction of the split core v12, and magnetic flux is generated in an inner direction of the split core v13. Thus, a magnetic circuit is set as indicated by arrows of FIG. 10, and the rotor 110 is rotated clockwise.

In other words, in the BLDC motor 100a of FIG. 10, the three-coil wired split cores v11-v13 are disposed to face in opposition to each other with an identical polarity in the form of the magnetic poles such as S-S, N-N, and S-S between the opposing magnets 365, 370, and 375 of the rotor 110, at the right portion of the split cores v11-v13 (that is, the teeth). Accordingly, a big repulsive force is generated between each of the split cores (that is, the teeth) v11-v13 and the rotor 110.

In addition, the three-coil wired split cores v11-v13 are disposed to face in opposition to each other with an opposing polarity to each other in the form of the magnetic poles such as N-S, S-N, and N-S between the opposing magnets 360, 365, and 370 of the rotor 110, at the left portion of the teeth of the split cores v11-v13, in which the left portion of the teeth of the split cores is relatively smaller than the right portion thereof. Accordingly, a small attractive force is generated between each of the split cores v11-v13 and the rotor 110.

Accordingly, both a small attractive force and a large repulsive force are generated between each of the split cores v11-v13 and the rotor 110 and an action of rotating the rotor 110 in a clockwise direction takes place.

Further, the three-coil wired split cores w11-w13 that are adjacent to and disposed at the rear end of the three-coil wired split cores v11-v13 are disposed to face in opposition to each other with an opposing polarity to each other in the form of the magnetic poles such as S-N, N-S, and S-N between the opposing magnets 375, 380, and 385 of the rotor 110, at the left portion of the teeth of the split cores w11-w13, and are disposed to face in opposition to each other with an identical polarity in the form of the magnetic poles such as N-N, S-S, N-N between the opposing magnets 380, 385, and 390 of the rotor 110, at the right portion of the outer side of the split cores w11-w13. Accordingly, the attractive force and repulsive force are generated between each of the split cores w11-w13 and the rotor 110 and thus an action of rotating the rotor 110 in a clockwise direction takes place.

In addition, in the same manner as the above-described case, the attractive force and repulsive force are generated between each of the split cores v14-v16 and the rotor 110 and between each of the split cores w14-w16 and the rotor 110, and thus the rotor 110 is rotated in a clockwise direction by an action of repelling (or pushing) and attracting (or pulling) the rotor 110.

Thereafter, the rotor 110 is rotated by 7.5° as a mechanical angle, and thus the Hall elements H1-H3 detect the polarity of the rotor 110 as "S, N, S". Accordingly, the controller (not shown) judges that the rotational position of the rotor 110 is regarded as 7.5° as a mechanical angle, according to Table 2. Thus, when the controller (not shown) applies drive signals to turn on the upper switching transistor FET3 and the lower switching transistor FET4, current flows to ground via FET3, V-phase coils (v1-v3), V-phase coils (v4-v6), W-phase coils (w6-w4), W-phase coils (w3-w1), and FET4.

Accordingly, magnetic flux is generated in an inner direction of the split core v11, magnetic flux is generated in an outer direction of the split core v12, and magnetic flux is generated in an inner direction of the split core v13. Thus, a magnetic circuit is set, and the rotor 110 is rotated clockwise.

In addition, in the same manner as the above-described case, the attractive force and repulsive force are generated between each of the split cores v14-v16 and the rotor 110 and between each of the split cores u14-u16 and the rotor 110, and thus the rotor 110 is rotated in a clockwise direction by an action of repelling (or pushing) and attracting (or pulling) the rotor 110.

As described above, in the case of six consecutive split cores of a pair of core groups that are activated even in the second embodiment of the present invention, the left sides of the teeth are set to have opposite polarities to each other with respect to the rotor 110, to thereby pull the rotor 110 in the direction of rotation by an attractive force, and the right sides of the teeth are set to have an identical polarity to each other, to thereby push the rotor 110 in the direction of rotation by a repelling attractive force.

That is, all of the three consecutive split cores of the four core groups generate the magnetic flux that makes the magnets of the rotor 110 facing the split cores rotate in an identical direction, to thus enable an effective force to be transmitted to the rotor.

The single rotor type BLDC motor according to the second embodiment employs a stator in which coils are wound in a three-coil wiring method that can increase efficiency by reducing the cogging noise and leakage flux, and shows the same functions and effects as those of the double rotor type BLDC motor according to the first embodiment. Therefore, the description thereof will be omitted.

In the above-described embodiments, the double rotor type motor in which the stator is made of split cores, and the stator is combined with the double rotor, and a single rotor and single stator motor have been described as examples, but the present invention can be applied for even a motor of a double rotor and double stator structure having an independent magnetic circuit in each of the inner and outer sides in an identical principle. Further, the present invention can be applied for an axial gap type motor in addition to a motor of a radial gap type structure.

In addition, the case that the stator coils are connected in a star connection structure in a three-phase drive system has been described, in the above-described embodiments, but the present invention can be applied for the case that the stator coils are connected in a delta connection structure.

Furthermore, the Hall elements are used to detect the rotor position information, in the above-described embodiments, but it is also possible to use other magnetic field detection elements for detecting a polarity change of the magnets of the rotating rotor.

In addition, the motor of the 18-slot and 16-pole structure has been described in the above-described embodiments, but the present invention can be applied to the motor that is set at a ratio such as 27-slot and 24-pole, 36-slot and 32-pole, and 45-slot and 40-pole, in an identical manner.

It has been described with respect to the case that the coils of the respective phases are wound on the three consecutive split cores in sequence of a forward direction, a reverse direction, and a forward direction so that the magnetic flux is generated in opposite directions between the three consecutive split cores in the above-described embodiments, but it is possible to wind the coils on the three split cores in sequence of a reverse direction, a forward direction, and a reverse direction, in which case the direction of rotation of the rotor is counter-clockwise.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention can be applied to a stator in which coils are wound on six consecutive split cores of a pair of core groups by using a three-coil wiring method, in a manner that magnetic flux is generated in opposite direction to each other between adjacent split cores or teeth, to thereby reduce cogging noise, to thereby reduce leakage magnetic flux, and to thus increase efficiency, a brushless direct-current (BLDC) motor using the same, and a driving method thereof.

The invention claimed is:

1. A brushless direct-current (BLDC) motor comprising:
a double rotor having an inner rotor and an outer rotor in which a number of N-pole and S-pole magnets consisting of opposite polarity are alternately arranged at opposite positions of the inner rotor and the outer rotor facing each other;
a stator having a plurality of split cores that are disposed between the inner rotor and the outer rotor and having slots therebetween, and on which coils of three phases are connected and wound in a three-phase drive method, the plurality of split cores comprise a number of core groups in which the coils of the respective phases are wound on three consecutive split cores in sequence of a forward direction, a reverse direction, and a forward direction, and the three consecutive split cores generate magnetic flux in opposite directions to each other, the number of magnetic poles in the inner rotor and the outer rotor of the motor being determined by using {(the number of slots/9)×8} and the number of slots is set to a multiple of nine (9); and
three Hall elements that detect a position signal of the double rotor, angular positions of the Hall elements being set according to an equation, where an angle between two adjacent Hall elements={(360°/the number of poles)×2÷3}, and wherein drive signals for the coils are applied by using the position signal of the double rotor detected by the three Hall elements.

2. The brushless direct-current (BLDC) motor of claim 1, wherein the number of core groups are alternately arranged per phase U, V, or W, and when drive signals are applied to every other two adjacent core groups, and thus the every other two adjacent core groups are activated, six split cores included in the two core groups generate magnetic flux in opposite directions to each other.

3. The brushless direct-current (BLDC) motor of claim 2, wherein the six consecutive split cores are set to have the same polarity as or opposite to magnetic poles of magnets of the inner rotor and the outer rotor that face each other, to effect rotation of the rotor in a common direction.

4. A brushless direct-current (BLDC) motor comprising:
a rotor in which a number of N-pole and S-pole magnets consisting of opposite polarity are alternately arranged;
a stator that is disposed with a gap spaced from the rotor and on which coils of three phases are connected in a three-phase drive method and wound on a plurality of teeth of a core, the plurality of teeth having slots therebetween, the plurality of teeth comprise a number of core groups in which the coils of the respective phases are wound on three consecutive teeth in sequence of a forward direction, a reverse direction, and a forward direction, and the three consecutive teeth generate magnetic flux in opposite directions to each other, the number of core groups are alternately arranged per phase U, V, or W, and when drive signals are applied to every other two adjacent core groups, and thus the every other two adjacent core groups are activated, six split cores included in the two core groups generate magnetic flux in opposite directions to each other, the number of magnetic poles in the rotor of the motor being determined by using {(the number of slots/9)×8} and the number of slots is set to a multiple of nine (9), and three Hall elements that detect a position signal of the rotor, angular positions of the Hall elements being set according to an equation, where an angle between two adjacent Hall elements={(360°/the number of poles)×2÷3}, and wherein drive signals for the coils are applied by using the position signal of the rotor detected by the three Hall elements.

5. The brushless direct-current (BLDC) motor of claim 4, wherein the number of magnets of the rotor is determined by using {(the number of slots/9)×8} and the number of slots is set to a multiple of nine (9).

6. The brushless direct-current (BLDC) motor of claim 4, wherein when drive signals are applied to every other two adjacent core groups, and thus the every other two adjacent core groups are activated, six consecutive teeth included in the adjacent two core groups generate magnetic flux in opposite directions to each other, and wherein the six consecutive teeth are set to have the same polarity as or opposite to magnetic poles of magnets of the rotor that face each other, to effect rotation of the rotor in a common direction.

7. The brushless direct-current (BLDC) motor of claim 4, wherein the core of the stator comprises a number of split cores and wherein each of the number of split cores comprises: T-shaped teeth on which the coils are wound; and a body that forms an annular back yoke that is extended from the T-shaped teeth and is connected to each other.

8. The brushless direct-current (BLDC) motor of claim 4, wherein the plurality of teeth comprise a number of core groups in which the coils of the respective phases are wound on three consecutive teeth in sequence of a forward direction, a reverse direction, and a forward direction, and wherein when drive signals are applied to the coils, a pair of six consecutive teeth of two phases from among the three phases are set to be activated, three consecutive teeth of one phase that is disposed between the pair of the six consecutive teeth are set to be inactivated, and the activated six consecutive teeth generate magnetic flux in opposite directions to each other.

9. A brushless direct-current (BLDC) motor comprising:

a rotor in which a number of N-pole and S-pole magnets consisting of opposite polarity are alternately arranged;

a stator including a plurality of split cores and having slots therebetween, three-phase coils that are wound on each of the plurality of the split cores, the three-phase coils are wound on three consecutive split cores per phase of U, V, or W in sequence of a forward direction, a reverse direction, and a forward direction, and a plurality of core groups, each core group including the adjacent split cores, which generate magnetic flux in opposite directions to each other, the number of magnetic poles in the motor being determined by using {(the number of slots/9)×8} and the number of slots is set to a multiple of nine (9); and three Hall elements that detect a position signal of the rotor, angular positions of the Hall elements being set according to an equation, where an angle between two adjacent Hall elements={(360°/the number of poles)×2÷3}, and wherein drive signals for the coils are applied by using the position signal of the rotor detected by the three Hall elements.

* * * * *